US011775807B2

(12) United States Patent
Kim et al.

(10) Patent No.: US 11,775,807 B2
(45) Date of Patent: Oct. 3, 2023

(54) ARTIFICIAL NEURAL NETWORK AND METHOD OF CONTROLLING FIXED POINT IN THE SAME

(71) Applicant: SAMSUNG ELECTRONICS CO., LTD., Suwon-si (KR)

(72) Inventors: Jae-Gon Kim, Hwaseong-si (KR); Kyoung-Young Kim, Suwon-si (KR); Do-Yun Kim, Gwacheon-si (KR); Jun-Seok Park, Hwaseong-si (KR); Sang-Hyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1224 days.

(21) Appl. No.: 16/367,662

(22) Filed: Mar. 28, 2019

(65) Prior Publication Data
US 2020/0074285 A1 Mar. 5, 2020

(30) Foreign Application Priority Data
Sep. 3, 2018 (KR) .................... 10-2018-0104403

(51) Int. Cl.
*G06N 3/063* (2023.01)
*G06F 17/18* (2006.01)
*G06F 7/499* (2006.01)

(52) U.S. Cl.
CPC .......... *G06N 3/063* (2013.01); *G06F 7/4991* (2013.01); *G06F 17/18* (2013.01)

(58) Field of Classification Search
CPC ...... G06N 3/063; G06N 7/005; G06F 7/4991; G06F 17/18
See application file for complete search history.

(56) References Cited

U.S. PATENT DOCUMENTS 6,879,971 B1 * 4/2005 Keeler ................ G06N 3/049
706/903
9,836,692 B1 12/2017 Gulland
(Continued)

FOREIGN PATENT DOCUMENTS

KR 10-1644039 B1 7/2016

OTHER PUBLICATIONS

Zhang et al., "LQ-Nets: Learned Quantization for Highly Accurate and Compact Deep Neural Networks", Jul. 26, 2018, arXiv: 1807.10029v1, pp. 1-21. (Year: 2018).*
(Continued)

*Primary Examiner* — Ying Yu Chen
(74) *Attorney, Agent, or Firm* — Sughrue Mion, PLLC

(57) ABSTRACT

An artificial neural network (ANN) system includes a processor, a virtual overflow detection circuit and a data format controller. The processor performs node operations with respect to a plurality of nodes included in each layer of an ANN to obtain a plurality of result values of the node operations and performs a quantization operation on the obtained plurality of result values based on a k-th fixed-point format for a current quantization of the each layer to obtain a plurality of quantization values. The virtual overflow detection circuit generates a virtual overflow information indicating a distribution of valid bit numbers of the obtained plurality of quantization values. The data format controller determines a (k+1)-th fixed-point format for a next quantization of the each layer based on the generated virtual overflow information. An overflow and/or an underflow are prevented efficiently by controlling the fixed-point format using the virtual overflow.

18 Claims, 21 Drawing Sheets

(56) References Cited

U.S. PATENT DOCUMENTS

| | | | |
|---|---|---|---|
| 10,491,239 B1* | 11/2019 | Hubara | G06F 5/012 |
| 2016/0328645 A1 | 11/2016 | Lin et al. | |
| 2016/0328646 A1* | 11/2016 | Lin | G06V 10/454 |
| 2017/0061279 A1 | 3/2017 | Yang et al. | |
| 2017/0220929 A1 | 8/2017 | Rozen et al. | |
| 2017/0323197 A1 | 11/2017 | Gibson et al. | |
| 2018/0046896 A1 | 2/2018 | Yu et al. | |

OTHER PUBLICATIONS

Sun et al., "XNOR-RRAM: A Scalable and Parallel Resistive Synaptic Architecture for Binary Neural Networks", Mar. 2018, 2018 Design, Automation & Test in Europe Conference & Exhibition (DATE), pp. 1423-1428. (Year: 2018).*

Buckman et al., "Thermometer Encoding: One Hot Way To Resist Adversarial Examples", Feb. 2018, https://openreview.net/forum?id=S18Su--CW pp. 1-22. (Year: 2018).*

* cited by examiner

FIG. 6

|        | QN | QN-1 | QN-2 | QN-3 | QN-4 | QN-5 | QN-6 | ... | Q0 | VBN |
|--------|----|------|------|------|------|------|------|-----|----|-----|
| QVL1   | 0  | 0    | 1    | 1    | 0    | 1    | 0    | ... | 1  | N-2 |
| QVL2   | 0  | 0    | 0    | 0    | 0    | 0    | 1    | ... | 0  | N-6 |
| QVL3   | 0  | 0    | 0    | 0    | 0    | 1    | 1    | ... | 0  | N-5 |
| QVL4   | 1  | 0    | 1    | 0    | 1    | 1    | 0    | ... | 0  | N   |
| QVL5   | 0  | 0    | 0    | 1    | 0    | 0    | 1    | ... | 0  | N-3 |
| QVL6   | 0  | 1    | 1    | 1    | 1    | 0    | 1    | ... | 1  | N-1 |
| QVL7   | 0  | 0    | 0    | 0    | 1    | 1    | 0    | ... | 0  | N-4 |
| QVL8   | 0  | 1    | 0    | 0    | 0    | 1    | 0    | ... | 1  | N-1 |
| QVL9   | 0  | 0    | 1    | 1    | 0    | 0    | 1    | ... | 0  | N-2 |
| QVL10  | 0  | 0    | 1    | 0    | 0    | 1    | 0    | ... | 0  | N-2 |

FIG. 7

| QN | QN-1 | |
|---|---|---|
| N | 1 | → SC(N) |
| N-1 | 2 | → SC(N-1) |
| N-2 | 3 | → SC(N-2) |
| N-3 | 1 | → SC(N-3) |
| N-4 | 1 | → SC(N-4) |
| N-5 | 1 | → SC(N-5) |
| N-6 | 1 | → SC(N-6) |
| N-7 | 0 | → SC(N-7) |
| ⋮ | ⋮ | |
| 1 | 0 | → SC(1) |
| 0 | 0 | → SC(0) |
| NT | 10 | |

FIG. 10

|  | TN | TN-1 | TN-2 | TN-3 | TN-4 | TN-5 | TN-6 |
|---|---|---|---|---|---|---|---|
| TCD1 | 0 | 0 | 1 | 1 | 1 | 1 | 1 |
| TCD2 | 0 | 0 | 0 | 0 | 0 | 0 | 1 |
| TCD3 | 0 | 0 | 0 | 0 | 0 | 1 | 1 |
| TCD4 | 1 | 1 | 1 | 1 | 1 | 1 | 1 |
| TCD5 | 0 | 0 | 0 | 1 | 1 | 1 | 1 |
| TCD6 | 0 | 1 | 1 | 1 | 1 | 1 | 1 |
| TCD7 | 0 | 0 | 0 | 0 | 1 | 1 | 1 |
| TCD8 | 0 | 1 | 1 | 1 | 1 | 1 | 1 |
| TCD9 | 0 | 0 | 1 | 1 | 1 | 1 | 1 |
| TCD10 | 0 | 0 | 1 | 1 | 1 | 1 | 1 |

| | CN | CN-1 | CN-2 | CN-3 | CN-4 | CN-5 | CN-6 |
|---|---|---|---|---|---|---|---|
| CCD1 | 0 | 0 | 1 | 0 | 0 | 0 | 0 |
| CCD2 | 0 | 0 | 0 | 0 | 0 | 0 | 1 |
| CCD3 | 0 | 0 | 0 | 0 | 0 | 1 | 0 |
| CCD4 | 1 | 0 | 0 | 0 | 0 | 0 | 0 |
| CCD5 | 0 | 0 | 0 | 1 | 0 | 0 | 0 |
| CCD6 | 0 | 1 | 0 | 0 | 0 | 0 | 0 |
| CCD7 | 0 | 0 | 0 | 0 | 1 | 0 | 0 |
| CCD8 | 0 | 1 | 0 | 0 | 0 | 0 | 0 |
| CCD9 | 0 | 0 | 1 | 0 | 0 | 0 | 0 |
| CCD10 | 0 | 0 | 1 | 0 | 0 | 0 | 0 |

⇓ BITWISE ACCUMULATION

ARTIFICIAL NEURAL NETWORK AND METHOD OF CONTROLLING FIXED POINT IN THE SAME

CROSS-REFERENCE TO RELATED APPLICATION

This U.S. non-provisional application claims priority under 35 USC § 119 to Korean Patent Application No. 10-2018-0104403, filed on Sep. 3, 2018 in the Korean Intellectual Property Office (KIPO), the disclosure of which is incorporated by reference in its entirety herein.

BACKGROUND

1. Technical Field

Apparatuses and methods consistent with one or more exemplary embodiments relate generally to a neural network, and more particularly to a neural network performing a dynamic fixed point policy and a method of controlling a fixed point in the artificial neural network.

2. Discussion of the Related Art

A fixed-point operation and a floating-point operation are basic operations performed by digital circuits such as a processor. As compared to the fixed-point operation, the floating-point operation provides a better accuracy and a wider range of expression, but longer operation time and higher power consumption. Accordingly, the fixed-point operation provides a more economical or efficient digital signal processing relative to to the floating-point operation. The fixed-point operation is particularly relevant in training an artificial neural network (ANN), which requires large amounts of calculations. However, the fixed-point operation scheme has a risk of overflow due to a narrow range of a real number. The overflow occurs when a data size under operation becomes larger than a register size of a processor. A fractional length corresponding to a size of a fraction portion may be reduced to prevent the overflow. When the fractional length is reduced unnecessarily, however, underflow may occur and precision or value resolution may be needlessly sacrificed.

SUMMARY

Aspects of one or more exemplary embodiments provide an artificial neural network (ANN) system capable of performing a dynamic fixed-point policy efficiently.

Aspects of one or more exemplary embodiments also provide a method of controlling a fixed point in an ANN system capable of performing a dynamic fixed-point policy efficiently.

According to an aspect of an exemplary embodiment, there is provided an artificial neural network (ANN) system including: a processor configured to perform node operations with respect to a plurality of nodes included in each layer of an ANN to obtain a plurality of result values of the node operations, and to perform a quantization operation on the obtained plurality of result values based on a k-th fixed-point format for a current quantization of the each layer to obtain a plurality of quantization values; a virtual overflow detection circuit configured to generate virtual overflow information indicating a distribution of valid bit numbers of the obtained plurality of quantization values; and a data format controller configured to determine a (k+1)-th fixed-point format for a next quantization of the each layer based on the generated virtual overflow information.

According to an aspect of another exemplary embodiment, there is provided an artificial neural network (ANN) system including: a virtual overflow detection circuit configured to: generate a plurality of thermometer codes corresponding to a plurality of quantization values, the plurality of quantization values being obtained by performing a quantization operation based on a fixed-point format, and generate virtual overflow information indicating a distribution of valid bit numbers of the plurality of quantization values based on the generated plurality of thermometer codes; and a data format controller configured to update the fixed-point format based on the generated virtual overflow information.

According to an aspect of another exemplary embodiment, there is provided a method of controlling a fixed point format in an artificial neural network (ANN) system, the method including: performing node operations with respect to a plurality of nodes included in each layer of an ANN to obtain a plurality of result values of the node operations; performing a quantization operation on the obtained plurality of result values based on a k-th fixed-point format for a current quantization of the each layer to obtain a plurality of quantization values; generating virtual overflow information indicating a distribution of valid bit numbers of the obtained plurality of quantization values; and determining a (k+1)-th fixed-point format for a next quantization of the each layer based on the generated virtual overflow information.

According to an aspect of another exemplary embodiment, there is provided a method of controlling a fixed point format in an artificial neural network (ANN) system, the method including: performing a quantization operation based on a k-th fixed-point format to obtain a plurality of quantization values; generating virtual overflow information indicating a distribution of valid bit numbers of the obtained plurality of quantization values; and updating the fixed-point format for a next quantization based on the generated virtual overflow information.

According to an aspect of another exemplary embodiment, there is provided a non-transitory computer-readable recording medium having recorded thereon a program executable by a computer for performing either of the above methods.

The ANN system and the method of controlling the fixed-point in the ANN system according to one or more exemplary embodiments may prevent the overflow and/or the underflow efficiently by controlling the fixed-point format using the virtual overflow and thus enhance performance of the ANN system and reduce power consumption of the ANN system.

BRIEF DESCRIPTION OF THE DRAWINGS

One or more exemplary embodiments will be more clearly understood from the following detailed description taken in conjunction with the accompanying drawings, in which:

FIG. 6 is a diagram illustrating an example of a plurality of quantization values corresponding to a plurality of nodes included in one layer according to an exemplary embodiment;

FIG. 7 is a diagram illustrating a frequency distribution of valid bit numbers of the plurality of quantization values of FIG. 6;

FIGS. 10 and 11 are diagrams for describing an operation of the virtual overflow detection circuit of FIG. 8;

DETAILED DESCRIPTION

Figure 1:
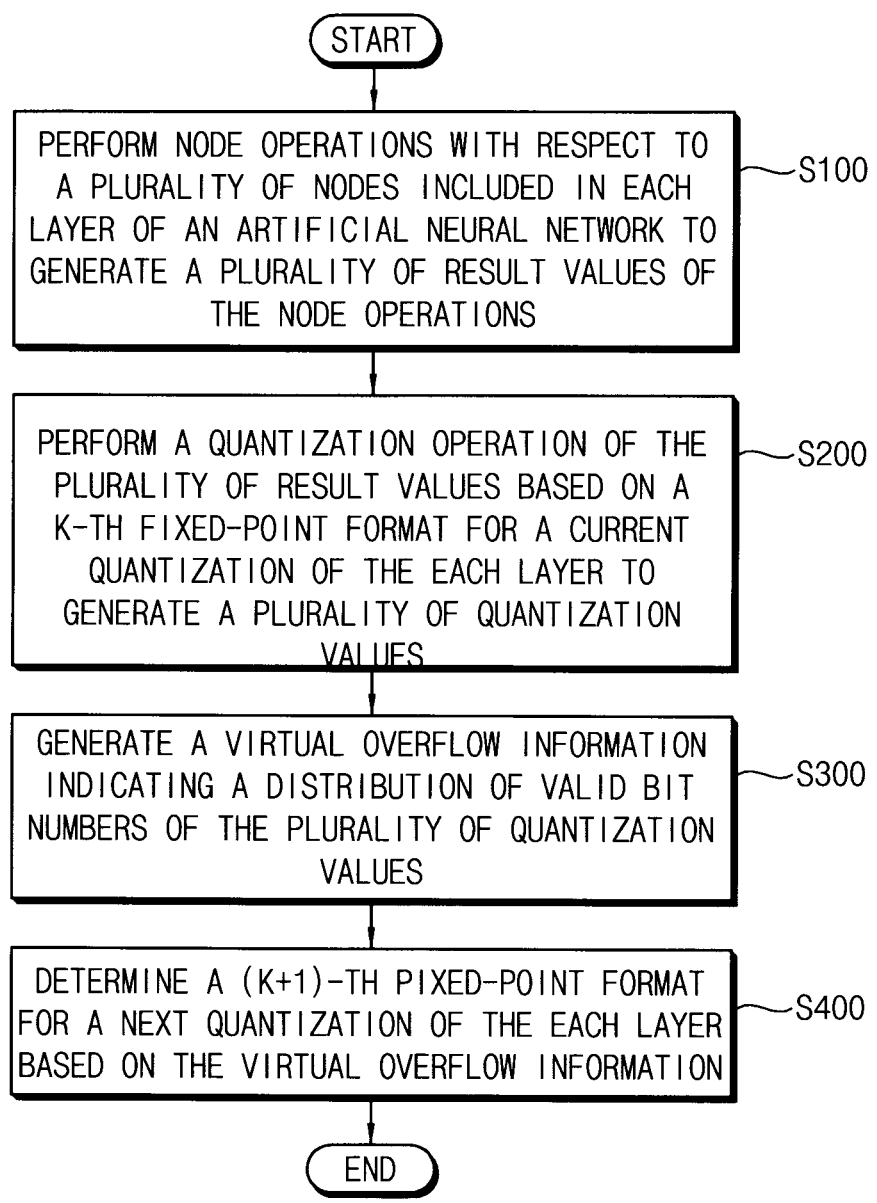
FIG. 1 is a flowchart illustrating a method of controlling a fixed-point in an artificial neural network (ANN) system according to an exemplary embodiment.

Various example embodiments will be described more fully hereinafter with reference to the accompanying drawings, in which some exemplary embodiments are shown. In the drawings, like numerals refer to like elements throughout. Repeated descriptions may be omitted.

Hereinbelow, it is understood that expressions such as "at least one of a, b or c" and "a, b, and/or c" means only a, only b, only c, both a and b, both a and c, both b and c, all of a, b, and c, or variations thereof.

FIG. 1 is a flowchart illustrating a method of controlling a fixed-point in an artificial neural network (ANN) system according to an exemplary embodiment.

Referring to FIG. 1, node operations are performed with respect to a plurality of nodes included in each layer of an ANN to generate (e.g., obtain) a plurality of result values of the node operations (S100). The ANN is a machine learning scheme, which is an operation model of software and/or hardware emulating a biological system (e.g., the human brain) using many artificial neurons connected through connection lines. The ANN uses the artificial neurons having simplified functions of the biological neurons and the artificial neurons are connected through connection lines of predetermined connection strengths to perform recognition or learning of a human being. Recently, deep learning is being studied to overcome limitations of the ANN. The deep learning ANN structure to which one or more exemplary embodiments may be applied will be described below with reference to FIGS. 3A and 3B.

A quantization operation on or with respect to the plurality of result values is performed based on a k-th fixed-point format for a current quantization of each layer of the ANN to generate (e.g., obtain) a plurality of quantization values (S200). The quantization based on the fixed-point policy will be described below with reference to FIGS. 5A and 5B.

A virtual overflow information indicating a distribution of valid bit numbers of the plurality of quantization values is generated (S300). Here, the virtual overflow information is not information indicating whether an overflow has actually occurred but information indicating a probability of an overflow during a next operation. In addition, the virtual overflow information may further include information indicating a probability of an underflow during the next operation.

In one or more exemplary embodiments, a plurality of count signals indicating frequency values of the valid bit numbers may be generated and the plurality of count signals may be provided as the virtual overflow information. The valid bits include a first bit having a value of 1 from a most significant bit of each quantization value and the lower bits of the first bit. One or more exemplary embodiments of generating the virtual overflow information will be described below with reference to FIGS. 6 through 15.

A (k+1)-th fixed-point format for a next quantization of the each layer is determined based on the virtual overflow information (S400). To make the ANN learn or to train the ANN may represent or include updating weight values of a current ANN. The update of the weight values may be progressed by repeatedly performing node operations according to a feed forward scheme and/or a back propagation scheme. In performing the repeated node operations, the fixed-point format may be updated whenever one iteration of the node operations is completed with respect to one layer. When the ANN includes a plurality of layers, the fixed-point format may be determined with respect to each layer and the update of the fixed-point format may be performed with respect to each layer. The (k+1)-th fixed-point format for the quantization of the next node operation results may be different from or identical to the k-th fixed-point format for the quantization of the present node operation result. One or more exemplary embodiments of updating the fixed-point format will be described below with reference to FIGS. 16 through 19.

As such, the overflow and/or the underflow may be prevented efficiently by controlling the fixed-point format using the virtual overflow. Thus, performance of the ANN system may be enhanced and power consumption of the ANN system may be reduced.

In a related art, a distribution of the quantization values themselves are obtained and an average and a statistical dispersion (such as a variance of the quantization values) are calculated to manage the fixed-point policy. In contrast, according to one or more exemplary embodiments, not the quantization values themselves but the virtual overflow information of the quantization values (e.g., the distribution of the valid bit numbers) may be obtained and the fixed-point policy may be managed based on the virtual overflow information. Hardware resources and a calculation amount for managing the fixed point dynamically may be significantly reduced according to one or more exemplary embodiments and the efficient dynamic fixed-point policy may be implemented.

Figure 2:
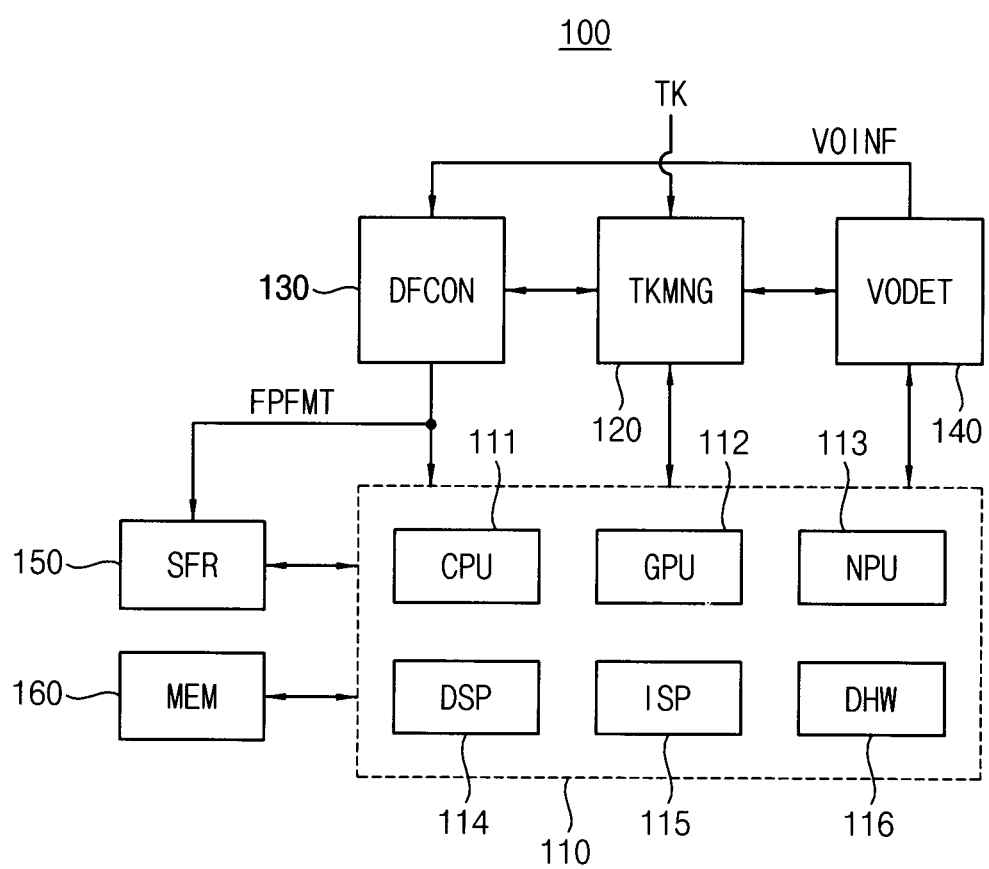
FIG. 2 is a block diagram illustrating an ANN system according to an exemplary embodiment.

FIG. 2 is a block diagram illustrating an ANN 100 system according to an exemplary embodiment.

Referring to FIG. 2, an ANN system 100 may include a plurality of processors 110, a task manager TKMNG 120, a data format controller DFCON 130 and a virtual overflow detection circuit VODET 140. The ANN system 100 may further include a special function register SFR 150 and a memory MEM 160.

The ANN system 100 may be driven by the plurality of processors 110. For example, the plurality of processors 110 may include heterogeneous processors as illustrated in FIG. 2. According to an exemplary embodiment, the plurality of processors 110 may include at least two homogeneous processors. Various services (e.g., a task TK or an application) such as an image classify service, a user authentication service, an advanced driver assistance system (ADAS) service, and/or a voice assistant service may be executed and processed by the plurality of processors 110.

The task TK may include at least one of a plurality of operations or arithmetic operations. For example, the task TK may represent applications such as an image classification service, a user authentication service based on biological information, an ADAS service, a voice assistant service, etc. For example, the plurality of operations may include various operations such as a convolution operation, a rectified linear unit (RELU) operation, etc.

The plurality of processors 110 may include a central processing unit (CPU) 111, a graphic processing unit (GPU) 112, a neural processing unit (NPU) 113, a digital signal processor (DSP) 114, an image signal processor (ISP) 115 and a dedicated hardware (DHW) 116. For example, the dedicated hardware 116 may include at least one of a vision processing unit (VPU), a vision intellectual property (VIP), etc. Each processor may be referred to as a processing element (PE).

Although FIG. 2 illustrates only computing resources as examples of the plurality of processors 110, the plurality of processors 110 may further include communication resources such as a direct memory access unit (DMA) for controlling access to the memory 160, a connectivity for supporting various internal and/or external communications, or the like.

The task manager 120 receives the task TK that is to be performed from an external device or by a user, manages or schedules the received task TK, and assigns the task TK to the plurality of processors 110. For example, the task manager 120 may assign operations included in the task TK to the plurality of processors 110, and generate path information that indicates a computing path for the task TK. The computing path for the task TK may include a sequence of operations included in the task TK and a driving sequence of processors for performing the operations included in the task TK.

At least one of the plurality of processors 110 may perform node operations with respect to a plurality of nodes included in each layer of an ANN to generate a plurality of result values of the node operations and perform a quantization operation on the plurality of result values based on a k-th fixed-point format for a current quantization of the each layer to generate a plurality of quantization values. In other words, at least one of the plurality of the processors 110 may perform the processes S100 and S200 in FIG. 1.

The virtual overflow detection circuit 140 may generate virtual overflow information VOINF indicating a distribution of valid bit numbers of the plurality of quantization values. In other words, the virtual overflow detection circuit 140 may perform the process S300 in FIG. 1. As will be described below with reference to FIGS. 6 and 7, the virtual overflow detection circuit 140 may generate a plurality of count signals indicating frequency values of the valid bit numbers and provide the plurality of count signals as the virtual overflow information.

The data format controller 130 may determine a (k+1)-th fixed-point format FPFMT for a next quantization of the each layer based on the virtual overflow information VOINF. In other words, the data format controller 130 may perform the process S400 in FIG. 1.

In one or more exemplary embodiments, the data format controller 130 may provide the determined (k+1)-th fixed-point format FPFMT to the special function register 150 and the special function register 150 may update the k-th fixed-point format stored therein to the (k+1)-th fixed-point format FPFMT. The plurality of processors 110 may perform the task TK using the dynamically-updated fixed-point format provided from the special function register 150.

In one or more other exemplary embodiments, the data format controller 130 may provide the fixed-point format FPFMT, which is updated whenever the node operations for one layer are repeated, directly to the plurality of processors 110. In other words, the data format controller 130 may provide the k-th fixed-point format to the plurality of processors 110 when the current node operations are performed for the one layer and provide the (k+1)-th fixed-point format to the plurality of processors 110 when the next node operations are performed for the one layer. In this case, the plurality of processors 110 may perform the task TK based on the dynamically-updated fixed-point format that is provided directly from the data format controller 130.

The memory 160 may store various data that are processed by the ANN system 100. The memory 160 may include at least one volatile memory such as a dynamic random access memory (DRAM), a synchronous DRAM (SDRAM), a static random access memory (SRAM), etc., and/or at least one nonvolatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc.

In one or more exemplary embodiments, at least a portion or all of the task manger 120, the data format controller 130 and/or the virtual overflow detection circuit 140 may be implemented as hardware, may be implemented as software (or program codes) stored in a storage device (such as a non-transitory computer-readable medium), or may be implemented as a combination of hardware and software.

It is understood that all elements in the ANN system 100 may be connected to one another via at least one bus, and thus all elements in the ANN system 100 may be communicate with one another via the at least one bus.

Also, the ANN system 100 may further include software elements, e.g., a framework, a kernel or a device driver, a middleware, an application programming interface (API), an application program or an application, or the like. At least a portion of the software elements may be referred to as an operating system (OS).

Figure 3A:
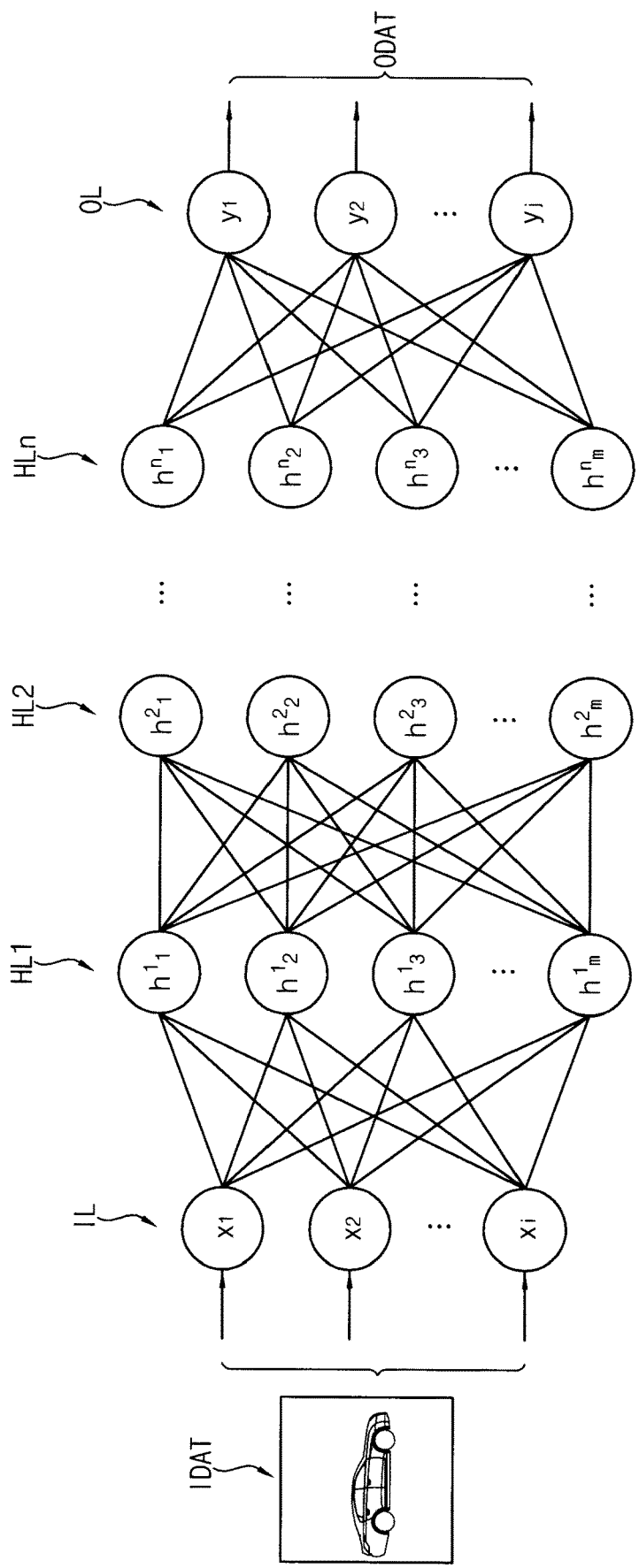
FIGS. 3A and 3B are diagrams for describing examples of a deep learning neural network structure that is driven by an ANN system according to one or more exemplary embodiments.
Figure 3B:
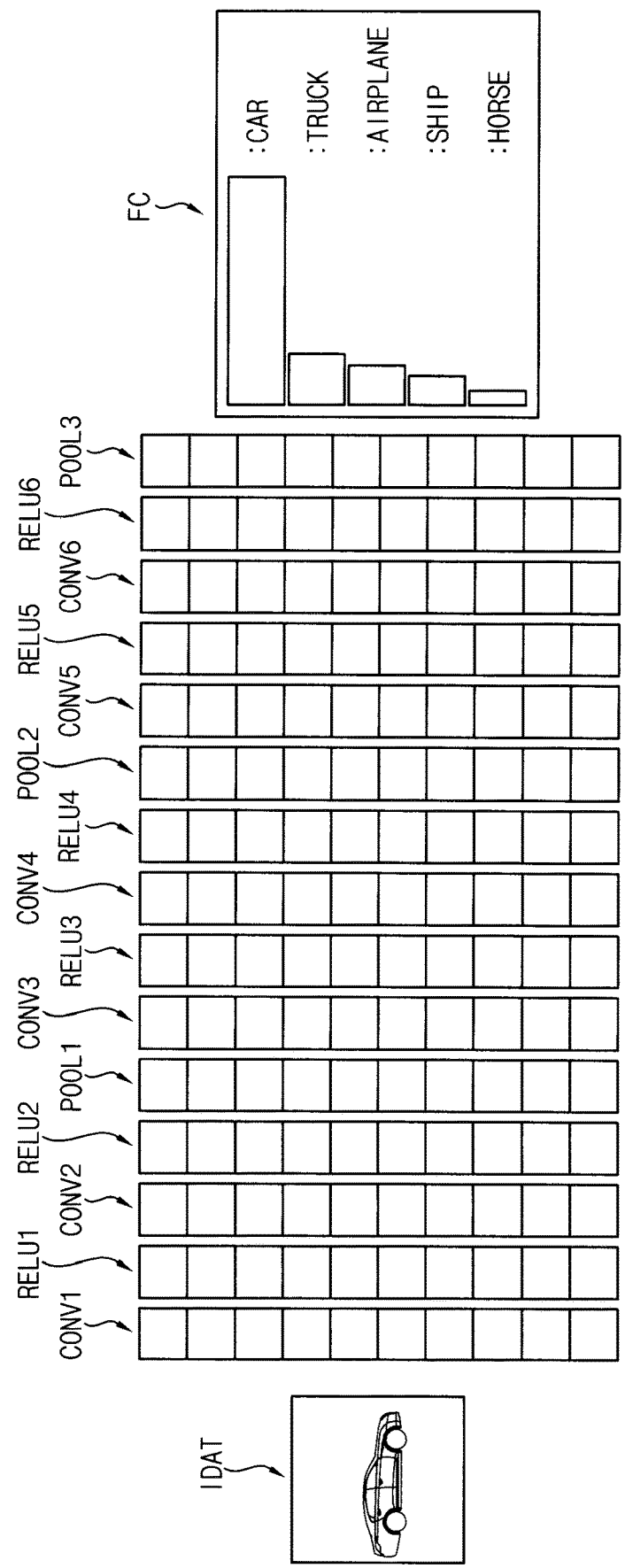

FIGS. 3A and 3B are diagrams for describing examples of a deep learning neural network structure that is driven by an ANN system according to one or more exemplary embodiments.

Referring to FIG. 3A, a general neural network may include an input layer IL, a plurality of hidden layers HL1, HL2, . . . , HLn and an output layer OL.

The input layer IL may include i input nodes x1, x2, . . . , xi, where i is a natural number. Input data (e.g., vector input data) IDAT whose length is i may be input to the input nodes x1, x2, . . . , xi such that each element of the input data IDAT is input to a respective one of the input nodes x1, x2, . . . , xi.

The plurality of hidden layers HL1, HL2, . . . , HLn may include n hidden layers, where n is a natural number, and may include a plurality of hidden nodes $h^1_1$, $h^1_2$, $h^1_3$, . . . , $h^1_m$, $h^2_1$, $h^2_2$, $h^2_3$, . . . , $h^2_m$, $h^n_1$, $h^n_2$, $h^n_3$, . . . , $h^n_m$. For example, the hidden layer HL1 may include m hidden nodes $h^1_1$, $h^1_2$, $h^1_3$, . . . , $h^1_m$, the hidden layer HL2 may include m hidden nodes $h^2_1$, $h^2_2$, $h^2_3$, . . . , $h^2_m$, and the hidden layer HLn may include m hidden nodes $h^n_1$, $h^h_2$, $h^n_3$, . . . , $h^n_m$, where m is a natural number.

The output layer OL may include j output nodes $y_1$, $y_2$, . . . , $y_j$, where j is a natural number. Each of the output nodes $y_1$, $y_2$, . . . , $y_j$ may correspond to a respective one of classes to be categorized. The output layer OL may output the output values (e.g., class scores or simply scores) associated with the input data IDAT for each of the classes. The output layer OL may be referred to as a fully-connected layer and may indicate, for example, a probability that the input data IDAT corresponds to a car.

A structure of the neural network illustrated in FIG. 3A may be represented by information on branches (or connections) between nodes illustrated as lines, and a weighted value assigned to each branch. Nodes within one layer may not be connected to one another, but nodes of different layers may be fully or partially connected to one another.

Each node (e.g., the node WO may receive an output of a previous node (e.g., the node $x_1$), may perform a computing operation, computation or calculation on the received output, and may output a result of the computing operation, computation or calculation as an output to a next node (e.g., the node $h^2_1$). Each node may calculate a value to be output by applying the input to a specific function, e.g., a nonlinear function.

Generally, the structure of the neural network may be set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 3A may not be suitable for handling input image data (or input sound data) because each node (e.g., the node $h^1_1$) is connected to all nodes of a previous layer (e.g., the nodes $x_1$, $x_2$, . . . , $x_i$ included in the layer IL) and then the number of weighted values drastically increases as the size of the input image data increases. Thus, a convolutional neural network (CNN), which is implemented by combining the filtering technique with the general neural network, has been researched such that two-dimensional image (e.g., the input image data) is efficiently trained by the convolutional neural network.

Referring to FIG. 3B, a convolutional neural network may include a plurality of layers CONV1, RELU1, CONV2, RELU2, POOL1, CONV3, RELU3, CONV4, RELU4, POOL2, CONV5, RELU5, CONV6, RELU6, POOL3 and FC.

Unlike the general neural network, each layer of the convolutional neural network may have three dimensions of width, height and depth, and thus data that is input to each layer may be volume data having three dimensions of width, height and depth. For example, if an input image in FIG. 3B has a size of 32 width units (e.g., 32 pixels) and 32 height units (e.g., 32 pixels) and three color channels R, G and B, input data IDAT corresponding to the input image may have a size of 32×32×3. The input data IDAT in FIG. 3B may be referred to as input volume data or input activation volume.

Each of convolutional layers CONV1, CONV2, CONV3, CONV4, CONV5 and CONV6 may perform a convolutional operation on input volume data. In an image processing, the convolutional operation represents an operation in which image data is processed based on a mask with weighted values and an output value is obtained by multiplying input values by the weighted values and adding up the total multiplied values. The mask may be referred to as a filter, window or kernel.

In further detail, parameters of each convolutional layer may consist of or include a set of learnable filters. Every filter may be spatially small (along width and height), but may extend through the full depth of an input volume. For example, during the forward pass, each filter may be slid (more precisely, convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32×32×3 passes through the convolutional layer CONV1 having four filters with zero-padding, output volume data of the convolutional layer CONV1 may have a size of 32×32×12 (e.g., a depth of volume data increases).

Each of RELU layers RELU1, RELU2, RELU3, RELU4, RELU5 and RELU6 may perform a rectified linear unit operation that corresponds to an activation function defined by, e.g., a function f(x)=max(0, x) (e.g., an output is zero for all negative input x). For example, if input volume data having a size of 32×32×12 passes through the RELU layer RELU1 to perform the rectified linear unit operation, output volume data of the RELU layer RELU1 may have a size of 32×32×12 (e.g., a size of volume data is maintained).

Each of pooling layers POOL1, POOL2 and POOL3 may perform a down-sampling operation on input volume data along spatial dimensions of width and height. For example, four input values arranged in a 2×2 matrix formation may be converted into one output value based on a 2×2 filter. For example, a maximum value of four input values arranged in a 2×2 matrix formation may be selected based on 2×2 maximum pooling, or an average value of four input values arranged in a 2×2 matrix formation may be obtained based on 2×2 average pooling. For example, if input volume data having a size of 32×32×12 passes through the pooling layer POOL1 having a 2×2 filter, output volume data of the pooling layer POOL1 may have a size of 16×16×12 (e.g., width and height of volume data decreases, and a depth of volume data is maintained).

Typically, one convolutional layer (e.g., CONV1) and one RELU layer (e.g., RELU1) may form a pair of CONV/RELU layers in the convolutional neural network, pairs of the CONV/RELU layers may be repeatedly arranged in the convolutional neural network, and the pooling layer may be periodically inserted in the convolutional neural network, thereby reducing an image spatial size and extracting an image characteristic.

An output layer or a fully-connected layer FC may output results (e.g., class scores) of the input volume data IDAT for each of the classes. For example, the input volume data IDAT corresponding to the two-dimensional image may be converted into a one-dimensional matrix or vector as the convolutional operation and the down-sampling operation are repeated. For example, the fully-connected layer FC may represent probabilities that the input volume data IDAT corresponds to a car, a truck, an airplane, a ship and a horse.

It is understood that the types and number of layers included in the convolutional neural network may not be limited to the example described above with reference to FIG. 3B and may be changed or vary according to one or more other exemplary embodiments. In addition, it is understood that the convolutional neural network may further include other layers such as a softmax layer for converting score values corresponding to predicted results into probability values, a bias adding layer for adding at least one bias, or the like.

As such, the deep learning ANN may include a plurality of layers, and the fixed-point format may be determined independently with respect to each of the plurality of layers. The nodes in each layer may perform the quantization based on the same fixed-point format. When the ANN includes a plurality of layers, the virtual overflow detection circuit 140 may generate a plurality of virtual overflow information corresponding to the plurality of layers, respectively, and the data format controller 130 may determine the (k+1)-th fixed-point format for the next quantization with respect to each of the plurality of layers based on the plurality of virtual overflow information.

Figure 4:
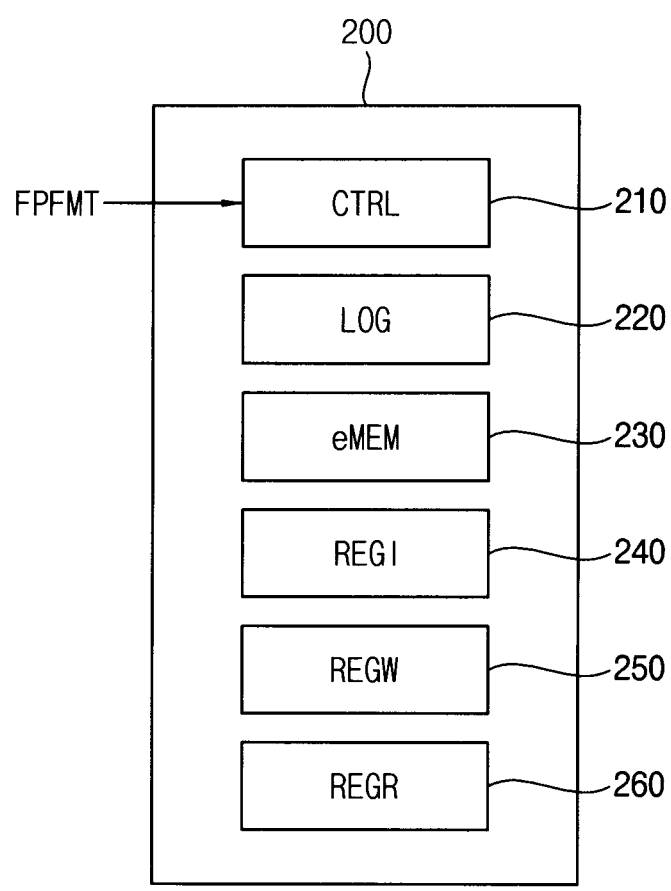
FIG. 4 is a block diagram illustrating a processor included in an ANN system according to an exemplary embodiment.

FIG. 4 is a block diagram illustrating a processor 200 included in an ANN system according to an exemplary embodiment.

Referring to FIG. 4, a processor 200 may include a control unit CTRL 210 (e.g., controller), a logic unit LOG 220 (e.g., logic), an embedded memory eMEM 230, an input register REGI 240, a weight register REGW 250 and a result register REGR 260. It is understood that the processor may include additional elements (e.g., general elements such as a signal bus).

The control unit 210 controls overall operations of the processor 200. The control unit 210 may control flows of instructions and data in implementation of the ANN. The embedded memory 230 may store the instructions and the data of the processor 200. Input data and weight values for node operations may be stored in the input register 240 and the weight register 250, respectively. The logic unit 220 may perform the node operations based on the input data and the weight values stored in the registers 240 and 250 and store result values of the node operations in the result register 260. The input register 240 and the weight register 250 may be implemented with memories having a higher operation speed than the embedded memory 230 so that the input data and the weight values may be loaded from the embedded memory 230 to the registers 240 and 250.

The control unit 210 may perform a quantization operation on the result values stored in the result register 260 based on the fixed-point format FPFMT provided from the special function register 150 or from the data format controller 130 in FIG. 2. The quantization values or the quantized values may be stored in the embedded memory 230. As described above, the fixed-point format may be updated dynamically.

Figure 5A:
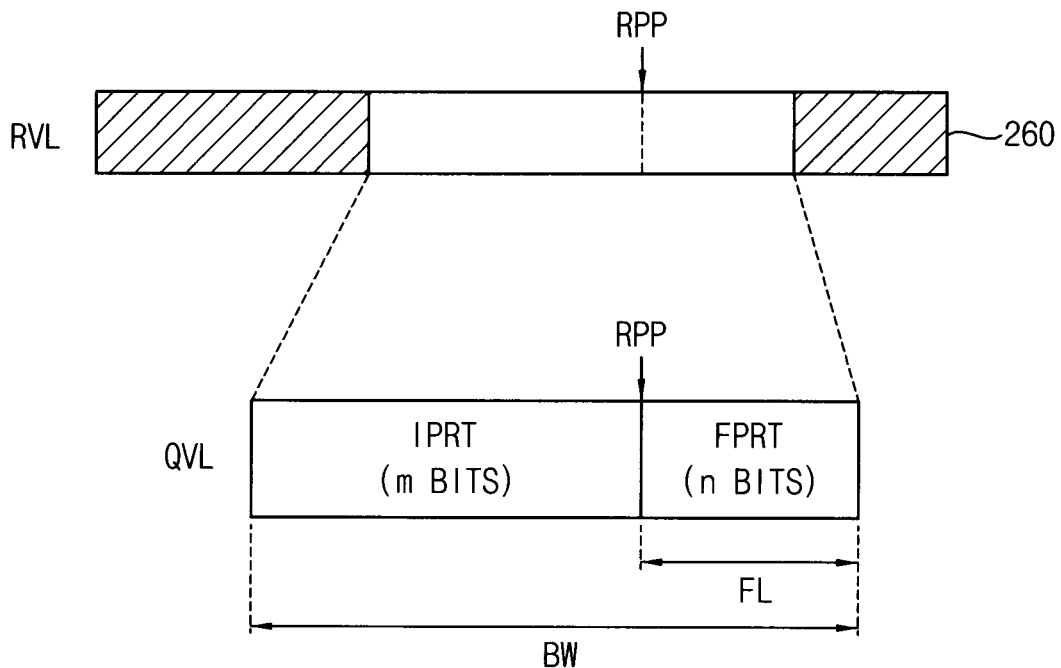
FIGS. 5A and 5B are diagrams for describing a quantization operation based on a fixed-point format according to one or more exemplary embodiments.
Figure 5B:
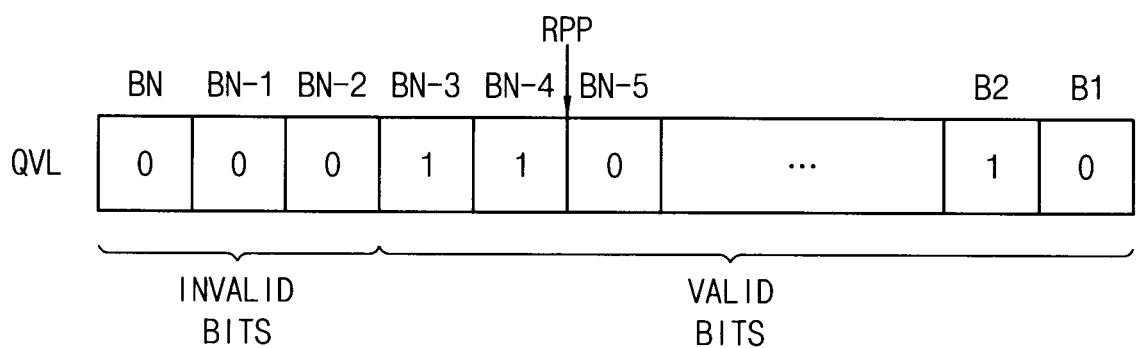

FIGS. 5A and 5B are diagrams for describing a quantization operation based on a fixed-point format according to one or more exemplary embodiments.

Referring to FIGS. 4 and 5A, the result value RVL of the node operation may be stored in the result register 260, and the control unit 210 may perform the quantization operation of the result value RVL based on the fixed-point format FPFMT to generate the quantization value QVL.

For example, the fixed-point format FPFMT may be represented by a Qm.n notation. In the Qm.n notation, m represents a bit number of an integer part and n represents a bit number of a fraction part. In other words, Qm.n represents that m bits are assigned before a radix point position RPP and n bits are assigned after the radix point position RPP. A bit width BW corresponding to an entire bit number assigned to the quantization value QVL is m+n and a fractional length corresponding to a bit number assigned to the fraction part is n.

FIG. 5B illustrates an example of a quantization value QVL having the bit width of N, that is, including N bits B1~BN. In the example of FIG. 5B, the bit number of the integer part is 5 and the fixed-point format may be represented as $Q_{5,N-5}$. The three bits BN, BN-1 and BN-2 having 0 from the most significant bit BN correspond to invalid bits. A first bit BN-3 having 1 from the most significant bit BN and the lower bits B1~BN-4 correspond to valid bits. Accordingly, in the example quantization value QVL of FIG. 5B, the invalid bit number is 3 and the valid bit number is N-3.

According to one or more exemplary embodiments, the virtual overflow detection circuit 140 may detect frequency values of the valid bit numbers of the plurality of quantization values corresponding to the plurality of nodes in each layer to provide the frequency values as the virtual overflow information VOINF.

FIG. 6 is a diagram illustrating an example of a plurality of quantization values corresponding to a plurality of nodes included in one layer, and FIG. 7 is a diagram illustrating a frequency distribution of valid bit numbers of the plurality of quantization values of FIG. 6.

Hereinafter, it is assumed that one layer includes ten nodes for convenience of illustration and description, but it is understood that this is only an example and other exemplary embodiments are not limited thereto. Each layer may include various numbers of nodes. As an example, each of first through tenth quantization values QVL1~QVL10 include first through N-th bits Q1~QN.

Referring to FIG. 6, the first quantization value QVL1 includes two invalid bits QN and QN-1 and the valid bit number VBN of the first quantization value QVL1 is N-2, the second quantization value QVL2 includes six invalid bits QN, QN-1, QN-2, QN-3, QN-4 and QN-5 and the valid bit number VBN of the second quantization value QVL2 is N-6, and the third quantization value QVL3 includes five invalid bits QN, QN-1, QN-2, QN-3 and QN-4 and the valid bit number VBN of the third quantization value QVL3 is N-5. In this way, the valid bit number VBN may be determined respectively with respect to each of the first through tenth quantization values QVL1~QVL10.

For convenience of illustration and description, FIG. 6 illustrates a case in which the valid bit numbers are distributed between N through N-6, but it is understood that this is only an example and other exemplary embodiments are not limited thereto. The valid bit numbers may be distributed between 0 through N depending on the result of the node operations.

The distribution of the quantization values QVL1~QVL10 of FIG. 6 may be represented as a frequency distribution diagram as shown in FIG. 7. A frequency distribution diagram represents mapping relations between a valid bit number VBN and a corresponding frequency value f(VBN). As illustrated in FIG. 7, f(N)=f(N−3)=f(N−4)=f(N−5)=f(n−6)=1, f(N−1)=2, f(N−2)-3 and f(N−7)~f(0)=0. Thus the total number NT of the frequency values becomes 10.

As such, the frequency values f(0)~f(N) may be determined by accumulating the valid bit numbers 0~N of the plurality of quantization values corresponding to the plurality of nodes included in one layer. As will be described below, a plurality of count signals SC(0)~SC(N) may be generated using hardware such as a thermometer code generation circuit, an accumulation circuit, etc., and the plurality of count signal SC(0)~SC(N) may be provided as the above-described virtual overflow information VOINF.

Figure 8:
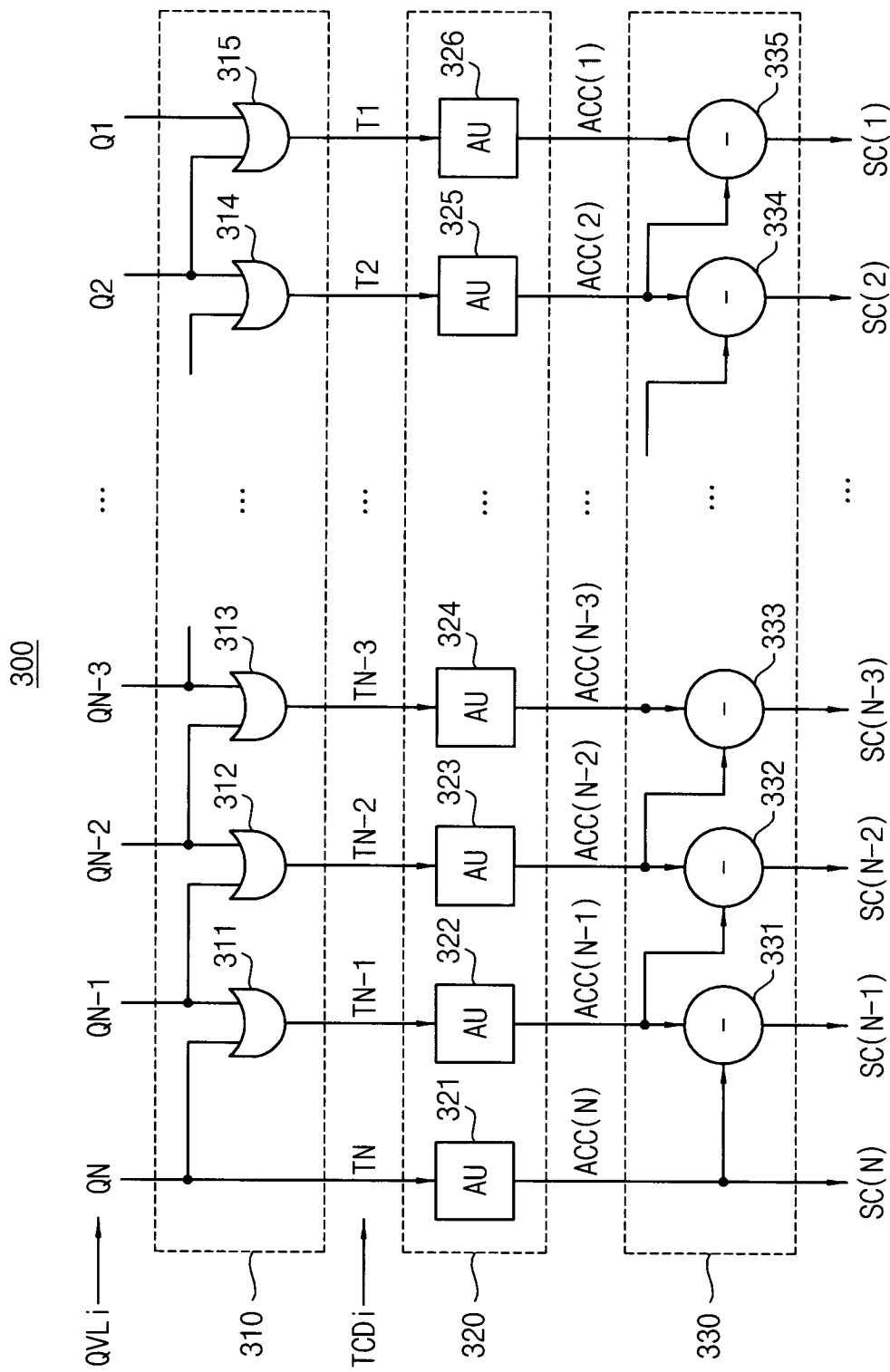
FIG. 8 is a diagram illustrating a virtual overflow detection circuit according to an exemplary embodiment.

FIG. 8 is a diagram illustrating a virtual overflow detection circuit 300 according to an exemplary embodiment.

Referring to FIG. 8, a virtual overflow detection circuit 300 may include a thermometer code generation circuit 310, an accumulation circuit 320 and a subtraction circuit 330.

The thermometer code generation circuit 310 may replace all valid bits of each quantization value QVLi to generate each thermometer code TCDi. The thermometer code generation circuit 310 may sequentially receive a plurality of quantization values corresponding to a plurality of nodes included in each layer and sequentially generate a plurality of thermometer codes corresponding to the plurality of quantization values.

In one or more exemplary embodiments, such as illustrated in FIG. 8, the thermometer code generation circuit 310 may include a plurality of OR logic gates 311~315. The plurality of OR logic gates 311~315 may perform OR logic operations on every two adjacent bits of each quantization value QVLi to generate each thermometer code TCDi. For example, the OR logic gate 311 performs the OR logic operation on the N-th bit QN and the (N-1)-th bit QN-1 of each quantization value QVLi to generate the (N-1)-th bit TN-1 of each thermometer code TCDi, and the OR logic gate 312 performs the OR logic operation on the (N-1)-th bit QN-1 and the (N-2)-th bit QN-2 of each quantization value QVLi to generate the (N-2)-th bit TN-2 of each thermometer code TCDi. The N-th bit QN corresponding to the most significant bit of each quantization value QVLi may be provided as the N-th bit TN corresponding to the most significant bit of each thermometer code TCDi. As such, the plurality of OR logic gates 311~315 may generate the first through N-th bits T1~TN of the thermometer code TCDi based on the first through N-th bits Q1~QN of the quantization value QVLi.

The accumulation circuit 320 may accumulate the plurality of thermometer codes bit by bit to generate a plurality of accumulation values ACC(1)·ACC(N). The accumulation circuit 320 may include a plurality of accumulators AU 321~326 receiving the bits T1~TN of the thermometer code TCDi, respectively. The plurality of accumulators 321~326 may output the stored values as the plurality of accumulation values ACC(1)~ACC(N) after the accumulation is completed with respect to the plurality of thermometer codes corresponding the plurality of nodes included in each layer. An example of the accumulator AU will be described below with reference to FIG. 9.

The subtraction circuit 330 may subtract two adjacent accumulation values of the plurality of accumulation values ACC(1)~ACC(N) to generate a plurality of count signals SC(1)~SC(N). The plurality of count signals SC(1)~SC(N) may be provided as the virtual overflow information VOINF to the data format controller 130 in FIG. 2.

The subtraction circuit 330 may include a plurality of subtractors 331~335. For example, the subtractor 331 may subtract the N-th accumulation value ACC(N) from the (N-1)-th accumulation value ACC(N-1) to generate the (N-1)-th count signal SC(N-1), and the subtractor 332 may subtract the (N-1)-th accumulation value ACC(N-1) from the (N-2)-th accumulation value ACC(N-2) to generate the (N-2)-th count signal SC(N-2). The N-th accumulation value ACC(N) may be provided as the N-th count signal SC(N). As such, the plurality of subtractors 331~335 may generate the first through N-th count signals SC(1)~SC(N) based on the first through N-th accumulation values ACC(1)~ACC(N).

Figure 9:
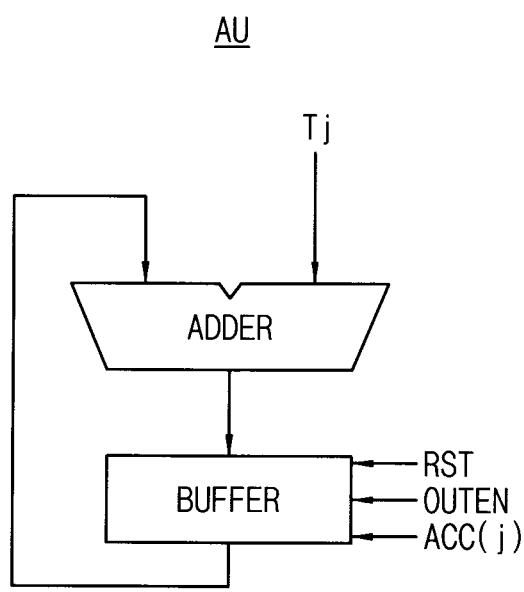
FIG. 9 is a diagram illustrating an exemplary embodiment of an accumulator included in the virtual overflow detection circuit of FIG. 8.

FIG. 9 is a diagram illustrating an exemplary embodiment of an accumulator AU included in the virtual overflow detection circuit 300 of FIG. 8.

Referring to FIG. 9, each accumulator AU included in the accumulation circuit 320 in FIG. 8 may include an adder and a buffer. The accumulator AU may accumulate each bit Tj of the thermometer code to provide each accumulation value ACC(j). The buffer may be initialized in response to a reset signal RST, and output the stored value as the accumulation value ACC(j) in response to an output control signal OUTEN that is activated after the accumulation is completed with respect to the plurality of thermometer codes corresponding to the plurality nodes included in each layer.

Figure 11:
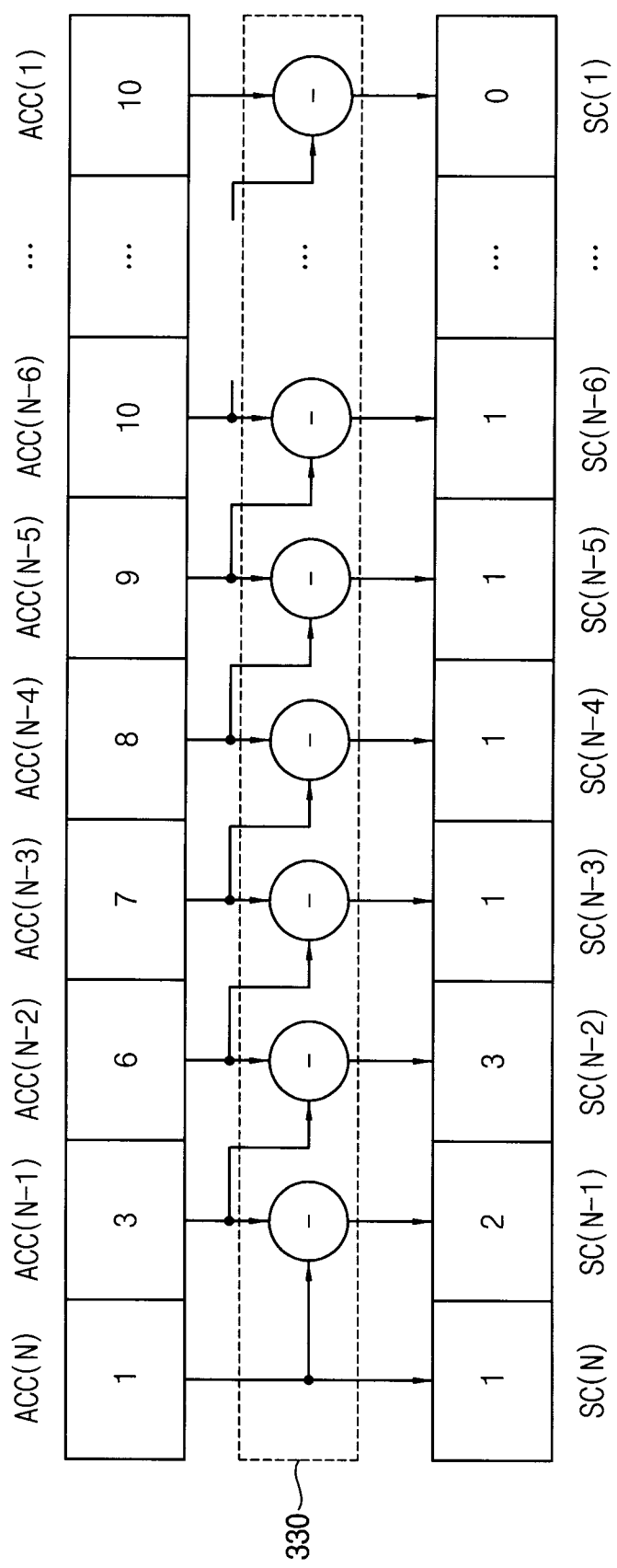

FIGS. 10 and 11 are diagrams for describing an operation of the virtual overflow detection circuit 300 of FIG. 8, according to one or more exemplary embodiments.

FIG. 10 illustrates a plurality of thermometer codes TCD1~TCD10 corresponding to the plurality of quantization values QVL1~QVL10 of FIG. 6.

Referring to FIGS. 8 and 10, the thermometer code generation circuit 310 may sequentially receive the plurality of quantization values QVL1~QVL10 and sequentially generate the plurality of thermometer codes TCD1~TCD10 corresponding to the plurality of quantization values QVL1~QVL10, respectively. As illustrated in FIG. 10, the invalid bits of the thermometer code have the value of 0 and the valid bits have the value of 1.

FIG. 11 illustrates the plurality of accumulation values ACC(1)~ACC(10) that are bitwise accumulations of the plurality of thermometer codes TCD1~TCD10. As described above, the subtraction circuit 330 may subtract two adjacent accumulation values of the plurality of accumulation values ACC(1)~ACC(N) to generate the plurality of count signals SC(1)~SC(N). As a result, the plurality of count signals SC(1)~SC(N) generated by the virtual overflow detection circuit 300 of FIG. 8 may be identical to the frequency values f(1)~f(N) as illustrated in FIG. 7.

Figure 12:
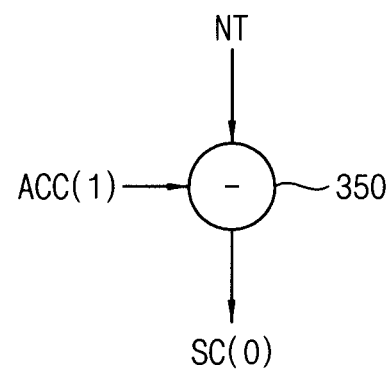
FIG. 12 is a diagram illustrating an exemplary embodiment of a zero data detection circuit included in the virtual overflow detection circuit of FIG. 8.

FIG. 12 is a diagram illustrating an exemplary embodiment of a zero data detection circuit included in the virtual overflow detection circuit 300 of FIG. 8.

Referring to FIG. 12, a zero data detection circuit may be implemented with one subtractor. The subtractor may subtract the first accumulation value ACC(1) from the total number NT of the plurality of nodes included in each layer to generate a zero data count signal SC(0). The total number NT of the plurality of nodes is equal to the total number of the quantization values and the sum NT of the frequency values of the valid bit numbers as described with reference to FIG. 7.

The zero data indicates the quantization with all bits having the value of 0. The thermometer code corresponding to the zero data has the value of 0 for all bits and thus the zero data does not contribute to the accumulation values ACC(1)~ACC(N) of the accumulation circuit 320. The first accumulation value ACC(1) indicates the number of quantization values of at least one bit of 1. As a result, the zero data count signal SC(0) may be generated by subtracting the first accumulation value ACC(1) from the total number NT. The zero data count signal SC(0) may be included in the virtual overflow information VOINF and provided to the data format controller 130.

As described with reference to FIGS. 8 through 12, the virtual overflow detection circuit 300 may generate the plurality of thermometer codes corresponding to the plurality of quantization values and generate the virtual overflow information VOINF based on the plurality of thermometer codes. The virtual overflow detection circuit 300 may generate the plurality of count signals SC(0)~SC(N) indicating the frequency values of the valid bit numbers with respect to each layer and provide the plurality of count signals SC(0)~SC(N) as the virtual overflow information VOINF.

As such, the ANN system and the method of controlling the fixed-point in the ANN system according to one or more exemplary embodiments may prevent the overflow and/or the underflow efficiently by controlling the fixed-point format using the virtual overflow. As a result, the performance of the ANN system is enhanced and power consumption of the ANN system is reduced, thereby improving the functioning of the ANN system.

Figure 13:
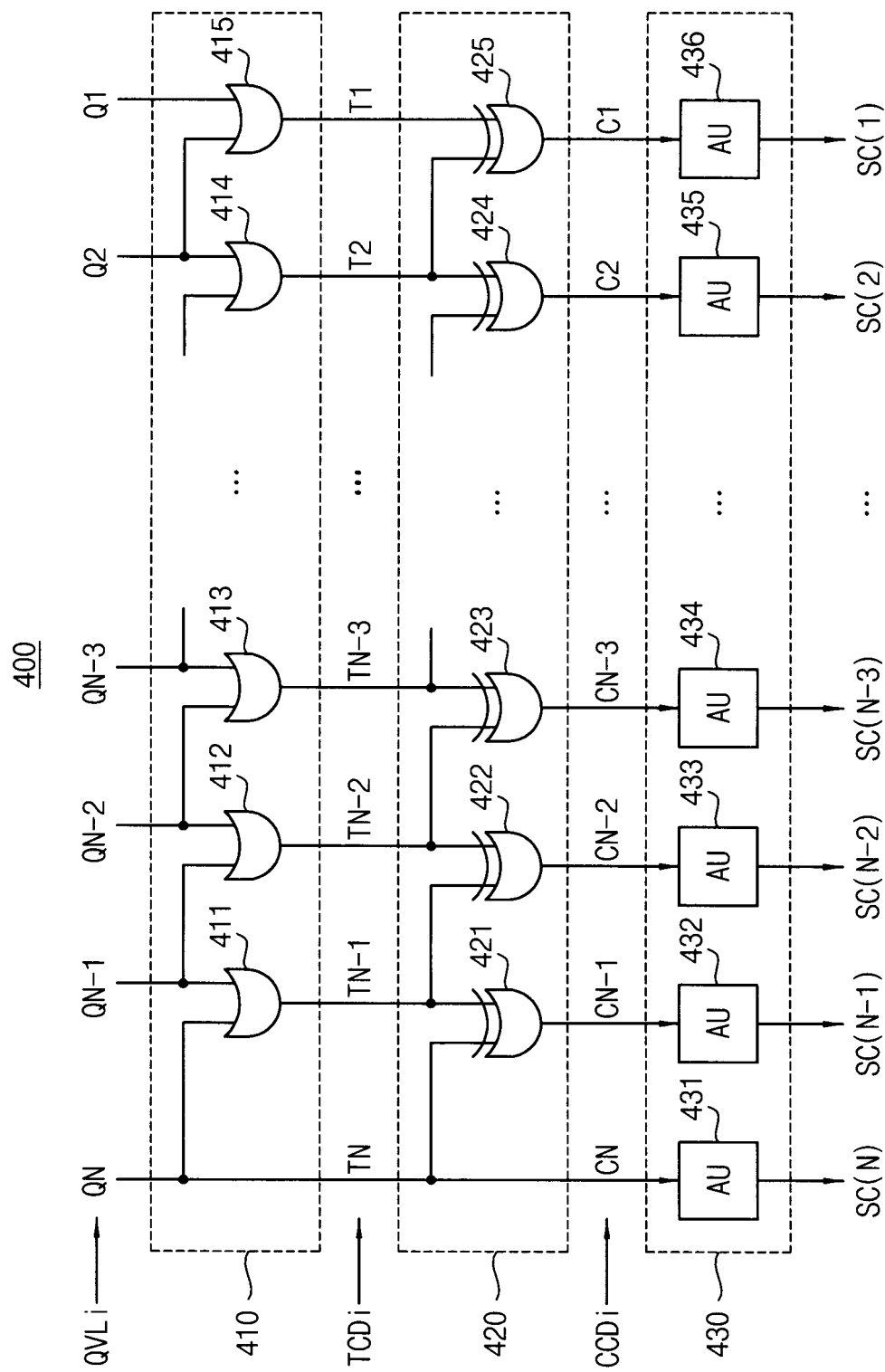
FIG. 13 is a diagram illustrating a virtual overflow detection circuit according to an exemplary embodiment.

FIG. 13 is a diagram illustrating a virtual overflow detection circuit 400 according to an exemplary embodiment.

Referring to FIG. 13, a virtual overflow detection circuit 400 may include a thermometer code generation circuit 410, a count code generation circuit 420 and an accumulation circuit 430.

The thermometer code generation circuit 410 may replace all valid bits of each quantization value QVLi to generate each thermometer code TCDi. The thermometer code generation circuit 410 may sequentially receive a plurality of quantization values corresponding to a plurality of nodes included in each layer and sequentially generate a plurality of thermometer codes corresponding to the plurality of quantization values.

In one or more exemplary embodiments, such as illustrated in FIG. 13, the thermometer code generation circuit 410 may include a plurality of OR logic gates 411~415. The plurality of OR logic gates 411~415 may perform OR logic operation on every two adjacent bits of each quantization value QVLi to generate each thermometer code TCDi. For example, the OR logic gate 411 performs the OR logic operation on the N-th bit QN and the (N-1)-th bit QN-1 to generate the (N-1)-th bit TN-1 of the thermometer code TCDi, and the OR logic gate 412 performs the OR logic operation on the (N-1)-th bit QN-1 and the (N-2)-th bit QN-2 to generate the (N-2)-th bit TN-2 of the thermometer code TCDi. The N-th bit QN corresponding to the most significant bit of the quantization value QVLi may be provided as the N-th bit TN corresponding to the most significant bit of the thermometer code TCDi. As such, the plurality of OR logic gates 311~315 may generate the first through N-th bits T1~TN of the thermometer code TCDi based on the first through N-th bits Q1~QN of the quantization value QVLi.

The count code generation circuit 420 may maintain a highest valid bit as 1 of valid bits and replace the other valid bits from 1 to 0 with respect to each thermometer code TCDi to generate each count code CCDi. The count code generation circuit 420 may sequentially receive a plurality of thermometer codes corresponding to a plurality of nodes included in each layer and sequentially generate a plurality of count codes corresponding to the plurality of thermometer codes.

In one or more exemplary embodiments, such as illustrated in FIG. 13, the count code generation circuit 420 may include a plurality of exclusive-OR (XOR) logic gates 421~425.

The plurality of XOR logic gates 421~425 may perform XOR logic operation on every two adjacent bits of each thermometer code TCDi to generate each count code CCDi corresponding to each thermometer code TCDi. For example, the XOR logic gate 421 performs the XOR logic operation on the N-th bit TN and the (N-1)-th bit TN-1 of each thermometer code TCDi to generate the (N-1)-th bit CN-1 of the count code CCDi, and the XOR logic gate 422 performs the XOR logic operation on the (N-1)-th bit TN-1 and the (N-2)-th bit TN-2 of each count code TCDi to generate the (N-2)-th bit CN-2 of each count code CCDi. The N-th bit TN corresponding to the most significant bit of each thermometer code TCDi may be provided as the N-th bit CN corresponding to the most significant bit of each count code CCDi. As such, the plurality of XOR logic gates 421~425 may generate the first through N-th bits C1~CN of the count code CCDi based on the first through N-th bits T1~TN of the thermometer code TCDi.

The accumulation circuit 430 may accumulate the plurality of count codes bit by bit to generate a plurality of count signals SC(1)~SC(N). The accumulation circuit 430 may include a plurality of accumulators AU 431~436 receiving the bits C1~CN of the count code CCDi, respectively. The plurality of accumulators 431~436 may output the stored values as the plurality of count signals SC(1)~SC(N) after the accumulation is completed with respect to the plurality of count codes corresponding the plurality of nodes included in each layer. An example of the accumulator AU is the same as (or similar to that) described with reference to FIG. 9.

Figure 14:
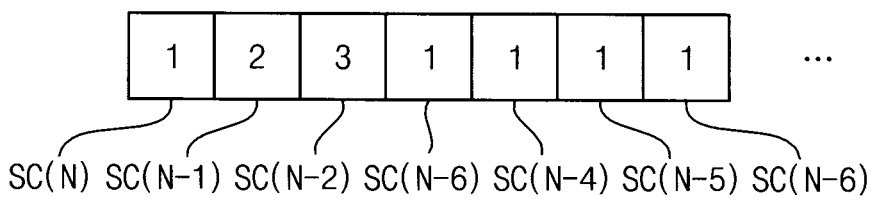
FIG. 14 is a diagram for describing an operation of the virtual overflow detection circuit of FIG. 13.

FIG. 14 is a diagram for describing an operation of the virtual overflow detection circuit 400 of FIG. 13, according to an exemplary embodiment.

FIG. 14 illustrates a plurality of count codes CCD1~CCD10 corresponding to the plurality of quantization values QVL1~QVL10 of FIG. 6 and the plurality of thermometer codes TCD1~TCD10 of FIG. 10.

Referring to FIGS. 13 and 14, the count code generation circuit 420 may sequentially receive the plurality of thermometer codes TCD1~TCD10 and sequentially generate the plurality of count codes CCD1~CCD10 corresponding to the plurality of thermometer code TCD1~TCD10, respectively. As illustrated in FIG. 14, the invalid bits of the thermometer code have the value of 0, the highest valid bit has the value of 1 and the other valid bits have the value of 0.

The plurality of count signals SC(1)~SC(N) are illustrated in the bottom portion of FIG. 14, which may be generated by the bitwise accumulation of the plurality of count codes CCD1~CCD10. As a result, the plurality of count signals SC(1)~SC(N) generated by the virtual overflow detection circuit 400 of FIG. 13 may be identical to the frequency values f(1)~f(N) as illustrated in FIG. 7.

As described with reference to FIGS. 13 and 14, the virtual overflow detection circuit 400 may generate the plurality of thermometer codes corresponding to the plurality of quantization values and generate the virtual overflow information VOINF based on the plurality of thermometer codes. The virtual overflow detection circuit 400 may generate the plurality of count signals SC(0)~SC(N) indicating the frequency values of the valid bit numbers with respect to each layer and provide the plurality of count signals SC(0) ~SC(N) as the virtual overflow information VOINF.

As such, the ANN system and the method of controlling the fixed-point in the ANN system according to an exemplary embodiment may prevent the overflow and/or the underflow efficiently by controlling the fixed-point format using the virtual overflow and. Thus, performance of the ANN system is enhanced and power consumption of the ANN system is reduced, thereby improving the functioning of the ANN system.

Figure 15:
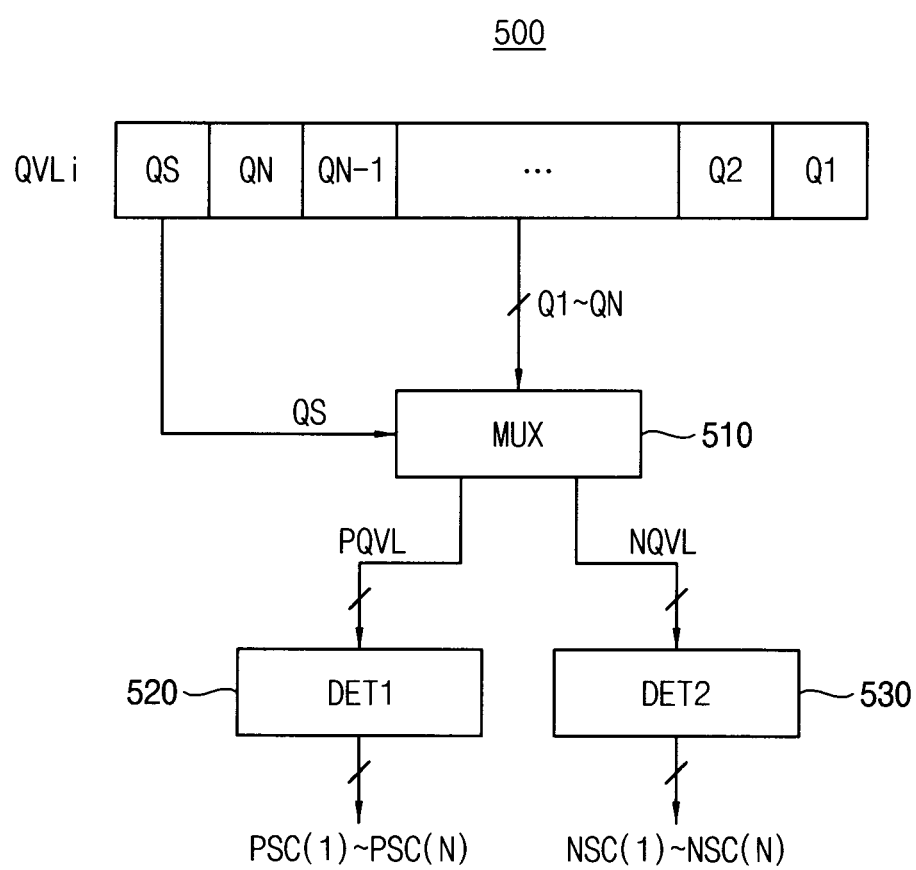
FIG. 15 is a diagram illustrating a virtual overflow detection circuit according to an exemplary embodiment.

FIG. 15 is a diagram illustrating a virtual overflow detection circuit 500 according to an exemplary embodiment.

Referring to FIG. 15, a virtual overflow detection circuit 500 may include a multiplexer MUX 510, a first detection circuit DET1 520 and a second detection circuit DET2 530.

The multiplexer 510 may sequentially receive the plurality of quantization values included in each layer and divide the plurality of quantization values to positive quantization values PQVL and negative quantization values NQVL based on a sign bit QS included in each quantization value $QVL_i$.

The first detection circuit 520 may generate positive count signals PSC(1)~PSC(N) indicating frequency values of the valid bit numbers of the positive quantization values PQVL. The second detection circuit 530 may generate negative count signals NSC(1)~NSC(N) indicating frequency values of the valid bit numbers of the negative quantization values NQVL. In one or more exemplary embodiments, each of the first detection circuit 520 and the second detection circuit 530 may be implemented as the virtual overflow detection circuit as described with reference to FIGS. 8 through 14.

As a result, the virtual overflow detection circuit 500 of FIG. 15 may generate the plurality of positive count signals PSC(1)~PSC(N) indicating the frequency values of the valid bit numbers of the plurality of positive quantization value PQVL and the plurality of negative count signals NSC(1) ~NSC(N) indicating the frequency values of the valid bit numbers of the plurality of positive quantization value PQVL. The plurality of positive count signals PSC(1)~PSC (N) and the plurality of negative count signals NSC(1)~NSC (N) may be provided as the above-described virtual overflow information VOINF. The zero data count signal SC(0) as described with reference to FIG. 12 may be further included in the virtual overflow information VOINF.

According to one or more exemplary embodiments, it may be determined whether the plurality of quantization values are in an overflow proximity state or in an underflow proximity state based on the virtual overflow information VOINF. In one or more exemplary embodiments, as will be described with reference to FIG. 16, the overflow proximity state and the underflow proximity state may be determined based on the frequency value f(N) of a maximum valid bit number N of the plurality of quantization values corresponding to the plurality of nodes included in each layer.

Figure 16:
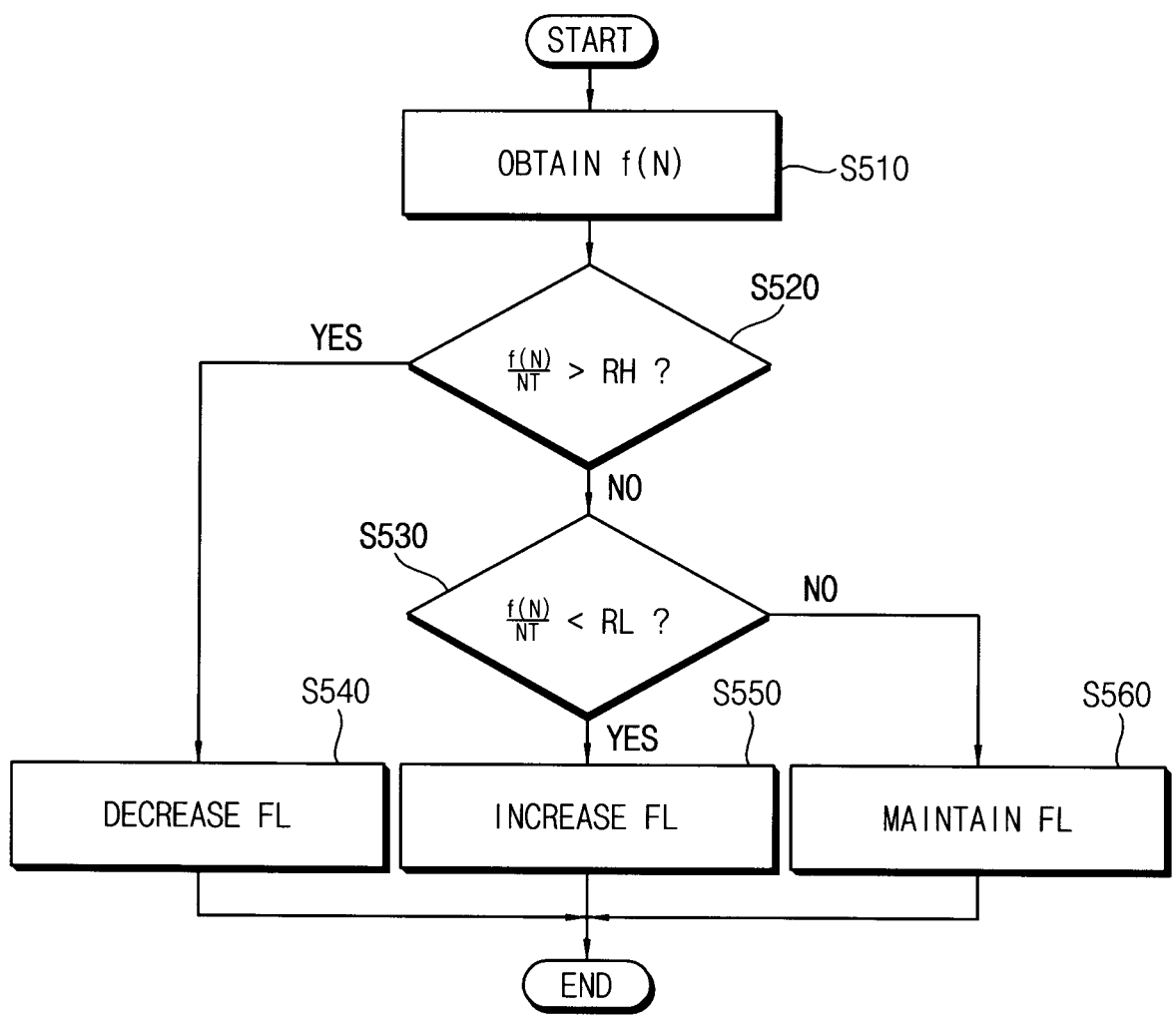
FIG. 16 is a flowchart illustrating a method of controlling a fixed-point format according to an exemplary embodiment.

FIG. 16 is a flowchart illustrating a method of controlling a fixed-point format according to an exemplary embodiment.

Referring to FIG. 16, the frequency value f(N) of a maximum valid bit number N of a plurality of quantization values corresponding to a plurality of nodes included in each layer is obtained (S510). The maximum valid bit number N corresponds to a bit width or a digit number of the plurality of quantization values.

The overflow proximity state and the underflow proximity state may be determined based on the frequency value f(N) of the maximum valid bit number N. In one or more exemplary embodiments, a ratio f(N)/NT of the frequency value f(N) of the maximum valid bit number N with respect to the sum NT of frequency values f(0)~f(N) of the valid bit numbers 0~N may be compared with an overflow threshold ratio RH or an underflow threshold ratio RL to determine whether the plurality of quantization values are in the overflow proximity state or in the underflow proximity state.

When the ratio f(N)/NT is higher than the overflow threshold ratio RH (S520: YES), a fractional length FL of the fixed-point format for the quantization is decreased (S540). The decrease of the fractional length FL will be described below with reference to FIGS. 17A and 17B.

When the ratio f(N)/NT is lower than the underflow threshold ratio RL (S530: YES), the fractional length FL of the fixed-point format for the quantization is increased (S550). The increase of the fractional length FL will be described below with reference to FIGS. 18A and 18B.

When the ratio f(N)/NT is not higher than the overflow threshold ratio RH (S520: NO) and is not lower than the underflow threshold ratio RL (S530: NO), the fractional length FL of the fixed-point format for the quantization is maintained (S560).

Figure 17A:
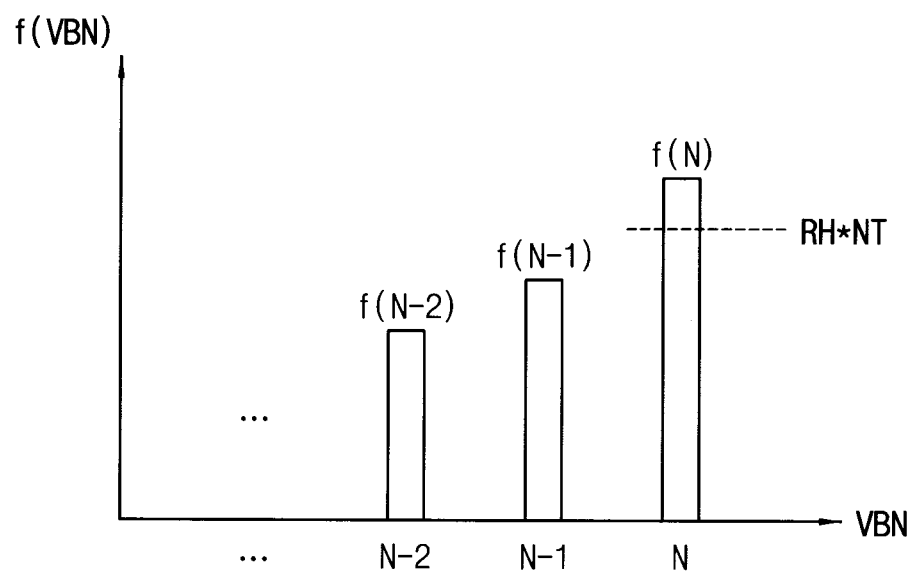
FIGS. 17A and 17B are diagrams for describing a method of preventing an overflow according to one or more exemplary embodiments.
Figure 17B:
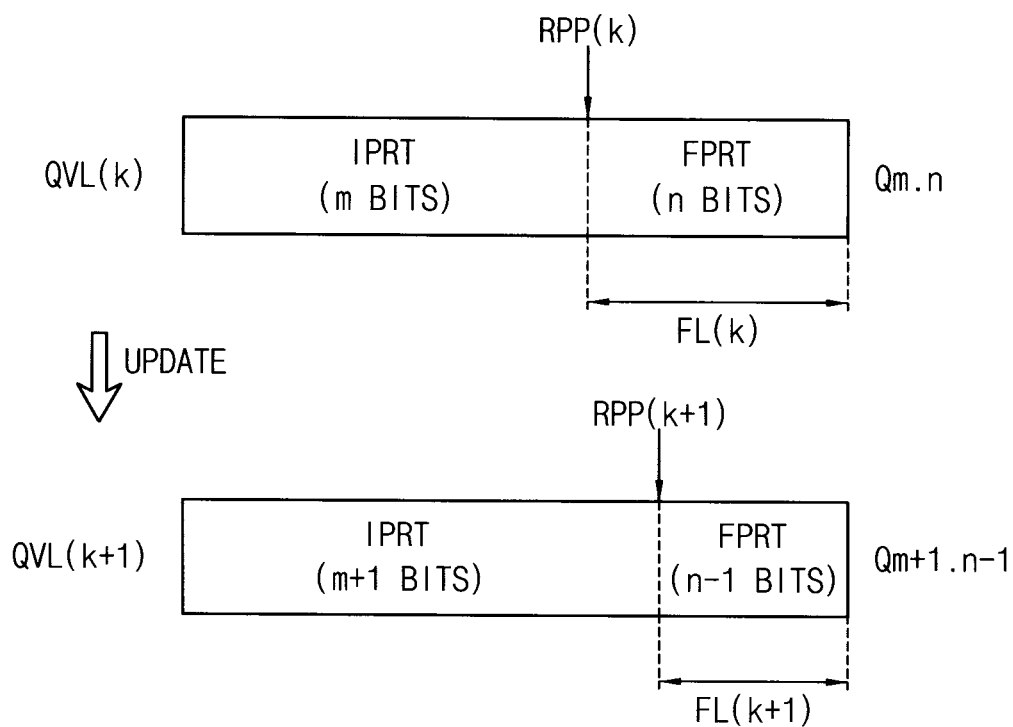

FIGS. 17A and 17B are diagrams for describing a method of preventing an overflow according to one or more exemplary embodiments.

Referring to FIGS. 2 and 17A, the data format controller 130 may determine that the plurality of quantization values are in the overflow proximity state, when (or based on) the ratio f(N)/NT of the frequency value f(N) of the maximum valid bit number N of the valid bit numbers 0~N of the plurality of quantization values corresponding to the plurality of nodes in each layer with respect to the sum NT of the frequency values f(0)~f(N) of the valid bit numbers 0~N is higher than the overflow threshold ratio RH. Here, the overflow proximity state indicates a very high probability that the overflow occurs during the next node operations for the associated layer.

FIG. 17B illustrates one quantization value QVL(K) based on a k-th fixed-point format Qm.n for a current quantization of a layer and a corresponding quantization value QVL(K+1) based on a (k+1)-th fixed-point format Qm+1.n−1 for a next quantization of the layer.

Referring to FIG. 17B, the k-th fixed-point format Qm.n indicates an integer part IPRT of m bits before a radix point position RPP(K) and a fraction part FPRT of n bits after the radix point position RPP(K). The (k+1)-th fixed-point format Qm+1.n−1 indicates the integer part IPRT of m+1 bits before a radix point position RPP(K+1) and the fraction part FPRT of n−1 bits after the radix point position RPP(K+1). In other words, a fractional length FL(K) of the k-th fixed-point format Qm.n is n and a fractional length FL(K+1) of the (k+1)-th fixed-point format Qm+1.n−1 is n−1.

As such, the data format controller 130 may decrease the fractional length FL(K+1) of the (k+1)-th fixed-point format Qm+1.n−1 to be shorter than the fractional length FL(k) of the k-th fixed-point format Qm.n, when the data format controller determines that the plurality of quantization values are in the overflow proximity state as described above with reference to FIG. 17A. The precision (or the value resolution) may be reduced but the overflow may be prevented by decreasing the fractional length for the next node operations.

Figure 18A:
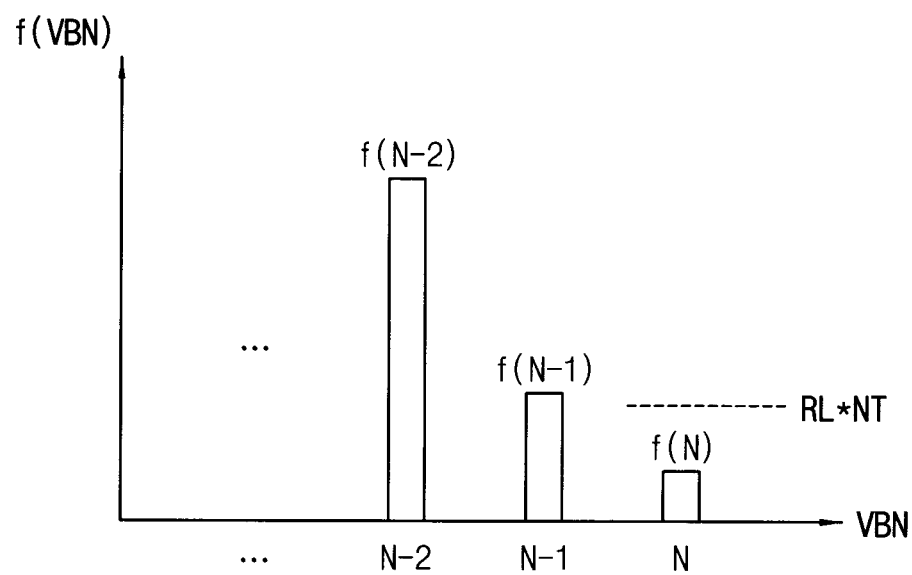
FIGS. 18A and 18B are diagrams for describing a method of preventing an underflow according to one or more exemplary embodiments.
Figure 18B:
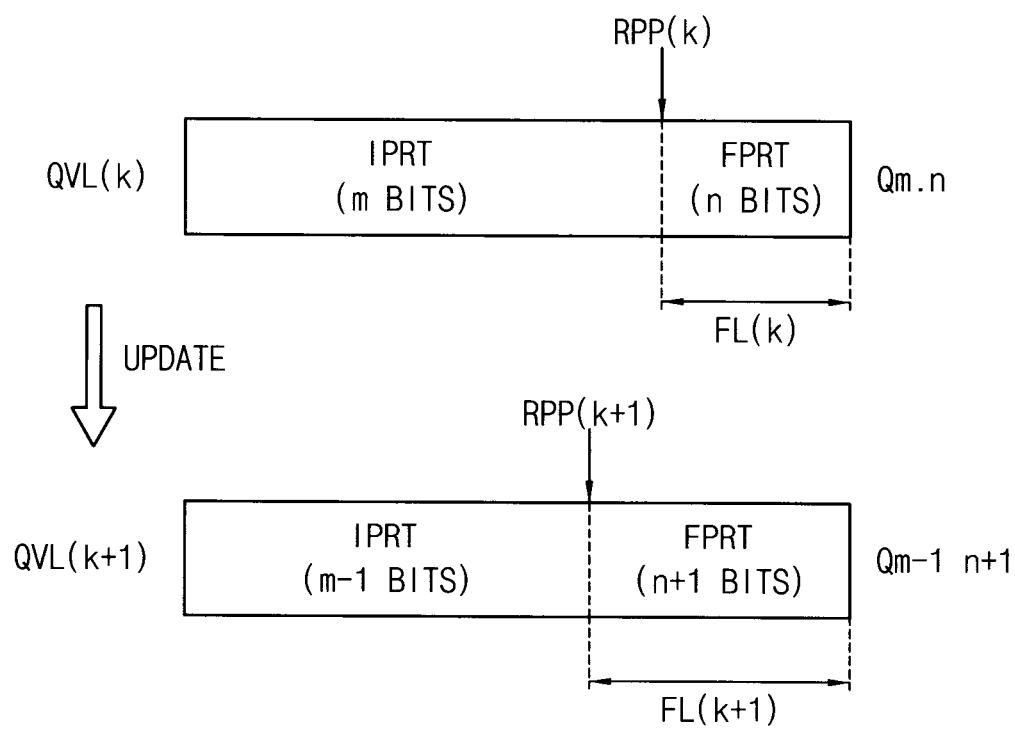

FIGS. 18A and 18B are diagrams for describing a method of preventing an underflow according to one or more exemplary embodiments.

Referring to FIGS. 2 and 18A, the data format controller 130 may determine that the plurality of quantization values are in the underflow proximity state, when the ratio f(N)/NT of the frequency value f(N) of the maximum valid bit number N of the valid bit numbers 0~N of the plurality of quantization values corresponding to the plurality of nodes in each layer with respect to the sum NT of the frequency values f(0)~f(N) of the valid bit numbers 0~N is lower than the underflow threshold ratio RL. Here, the underflow proximity state indicates a very high probability that the underflow occurs during the next node operations for the associated layer.

FIG. 18B illustrates one quantization value QVL(K) based on a k-th fixed-point format Qm.n for a current quantization of a layer and a corresponding quantization value QVL(K+1) based on a (k+1)-th fixed-point format Qm−1.n+1 for a next quantization of the layer.

Referring to FIG. 18B, the k-th fixed-point format Qm.n indicates an integer part IPRT of m bits before a radix point position RPP(K) and a fraction part FPRT of n bits after the radix point position RPP(K). The (k+1)-th fixed-point format Qm−1.n+1 indicates the integer part IPRT of m−1 bits before a radix point position RPP(K+1) and the fraction part FPRT of n+1 bits after the radix point position RPP(K+1). In other words, a fractional length FL(K) of the k-th fixed-point format Qm.n is n and a fractional length FL(K+1) of the (k+1)-th fixed-point format Qm−1.n=1 is n+1.

As such, the data format controller 130 may increase the fractional length FL(K+1) of the (k+1)-th fixed-point format Qm−1.n+1 to be longer than the fractional length FL(k) of the k-th fixed-point format Qm.n, when the data format controller determines that the plurality of quantization values are in the underflow proximity state as described with reference to FIG. 18A. The precision (or the value resolution) may be increased and the underflow may be prevented by increasing the fractional length for the next node operations.

Figure 19:
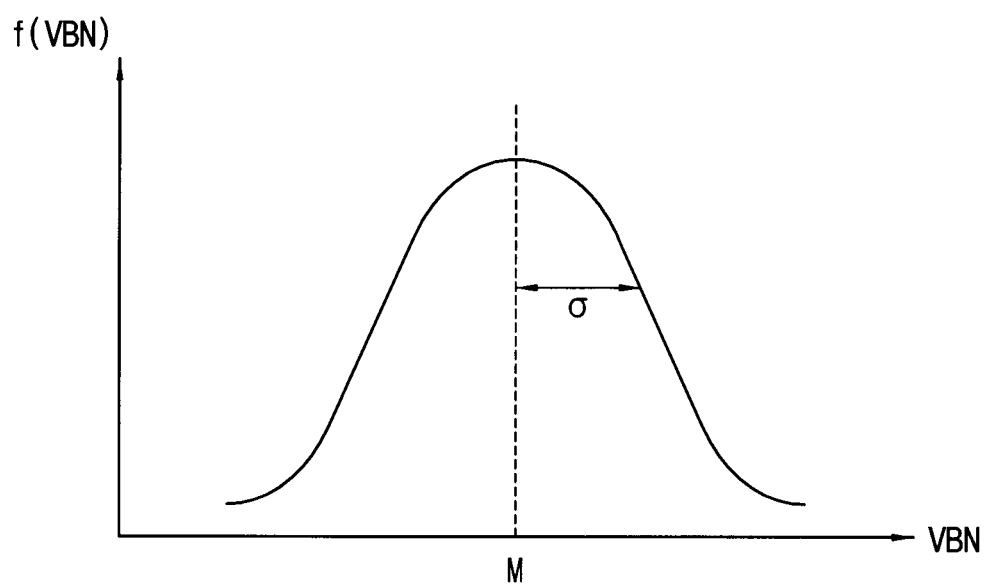
FIG. 19 is a diagram illustrating an example distribution of valid bit numbers of quantization values according to an exemplary embodiment.

FIG. 19 is a diagram illustrating an example distribution of valid bit numbers of quantization values according to an exemplary embodiment.

Referring to FIG. 19, the frequency values f(VBN) of the valid bit numbers VBN of the quantization values may be approximated as a normal distribution. In this case, the data format controller 130 in FIG. 2 may calculate an average M and a variance $\sigma^2$ of the valid bit numbers VBN and determine the fractional length of the (k+1)-th fixed-point format for the next quantization based on the average M and the variance $\sigma^2$.

FIG. 19 illustrates an example in which the frequency values f(VBN) approach the normal distribution, but it is understood that this is just an example and one or more other exemplary embodiments are not limited thereto. For example, according to another exemplary embodiment, the frequency values f(VBN) of the valid bit numbers VBN may be approximated as a single-ended gamma distribution in the case of a convolutional neural network (CNN). In this case, a step size may be calculated based on an average and a variance of the gamma distribution and the fractional length may be determined based on the step size.

Figure 20:
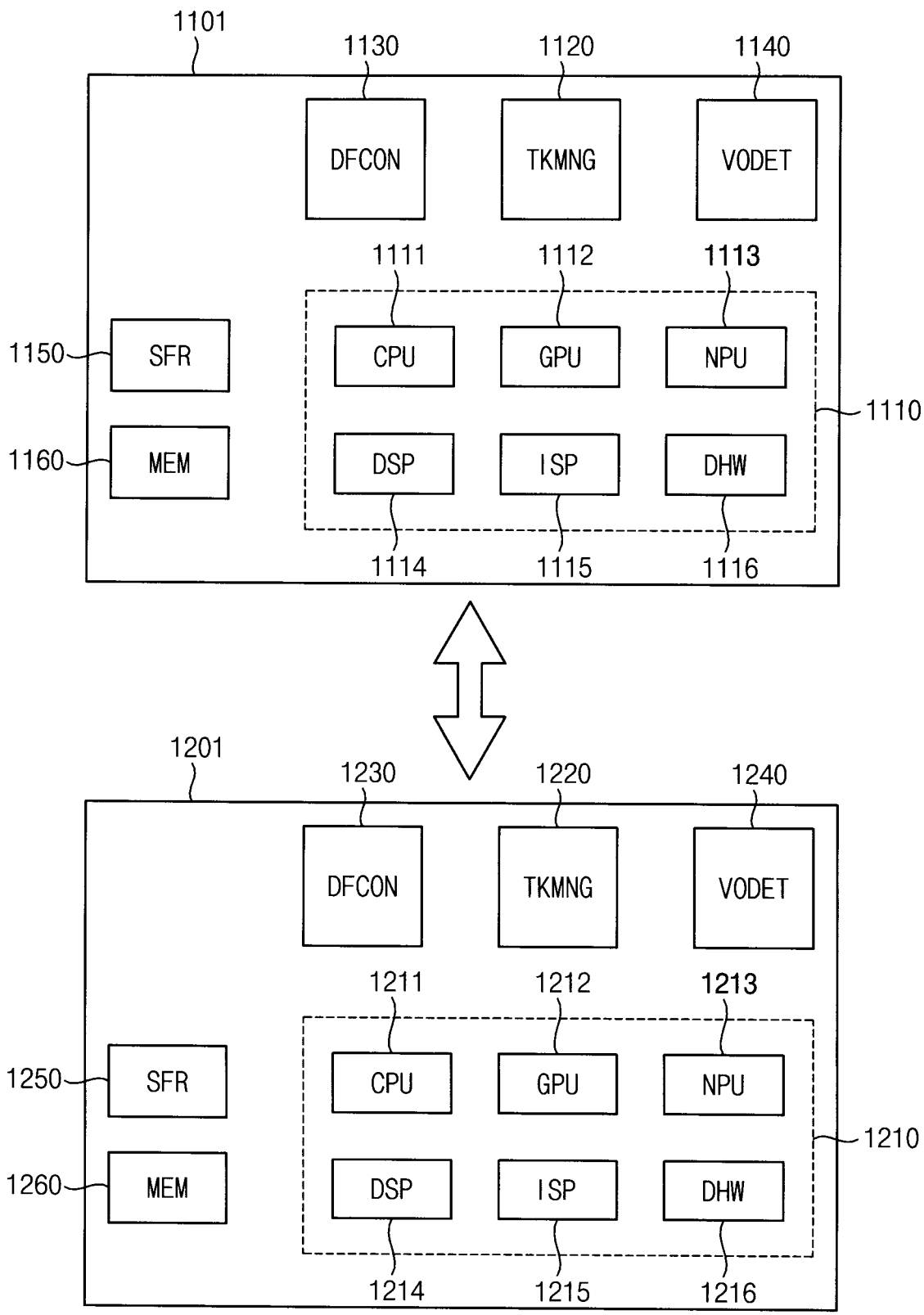
FIG. 20 is a block diagram illustrating an ANN system according to an exemplary embodiment.

FIG. 20 is a block diagram illustrating an ANN system according to an exemplary embodiment.

Referring to FIG. 20, an ANN system may include a first electronic device 1101 and a second electronic device 1201. In the present exemplary embodiment, the deep learning system may be driven by the first electronic device 1101 and the second electronic device 1201.

The first electronic device 1101 may include a plurality of heterogeneous processors 1110, a task manager TKMNG 1120, a data format controller DFCON 1130, a virtual overflow detection circuit VODET 1140, a special function register SFR 1150 and a memory MEM 1160. The first electronic device 1201 may include a plurality of heterogeneous processors 1210, a task manager 1220, a data format controller 1230, a virtual overflow detection circuit 1240, a special function register 1250 and a memory 1260. The plurality of heterogeneous processors 1110 in the first electronic device 1101 and the plurality of heterogeneous processors 1210 in the second electronic device 1201 may respectively include CPUs 1111 and 1211, GPUs 1112 and 1212, NPUs 1113 and 1213, DSPs 1114 and 1214, ISPs 1115 and 1215, and dedicated hardwares 1116 and 1216.

The pluralities of heterogeneous processors 1110 and 1210, the task managers 1120 and 1220, the data format controllers 1130 and 1230, the virtual overflow detection circuits 1140 and 1240, the special function registers 1150 and 1250, and the memories 1160 and 1260 in FIG. 20 may be substantially the same as or similar to those described above with reference to FIGS. 1, 2, 3A 3B, 4, 5A-5B, and 6 through 19.

In one or more exemplary embodiments, some of the heterogeneous processors (e.g., 1111, 1112, 1113, 1114, 1115 and 1116) may be included in the first electronic device 1101, and others of the heterogeneous processors (e.g., 1211, 1212, 1213, 1214, 1215 and 1216) may be included in the second electronic device 1201. The first electronic device 1101 may be an electronic device that directly interacts with a user (e.g., directly controlled by a user). The second electronic device 1201 may be physically separated from the first electronic device 1101, and may be interoperable with the first electronic device 1101.

In one or more exemplary embodiments, the first electronic device 1101 may be any computing device and/or mobile device, such as a personal computer (PC), a laptop computer, a mobile phone, a smart phone, a tablet computer, a personal digital assistants (PDA), a portable multimedia player (PMP), a digital camera, a camcorder, a music player, a video player, a portable game console, a navigation device, a wearable device, an internet of things (IoT) device, an internet of everythings (IoE) device, a virtual reality (VR) device, an augmented reality (AR) device, a server, a workstation, an autonomous control device, etc.

In one or more exemplary embodiments, the second electronic device 1201 may be any computing device and/or mobile device that is interoperable with the first electronic device 1101. For example, the second electronic device 1201 may be a companion device that depends on the first electronic device 1101, such as a wearable device (e.g., a smart watch). Alternatively, the second electronic device 1201 may be an in-house server (e.g., a home gateway) that controls an IoT device and/or an IoE device, or an outside server (e.g., a cloud server).

Exemplary embodiments may be applied to various devices and systems that include the deep learning, ANN and/or machine learning systems. For example, the exemplary embodiments may be applied to systems such as be a mobile phone, a smart phone, a tablet computer, a laptop computer, a PDA, a PMP, a digital camera, a portable game console, a wearable system, an IoT system, a VR system, an AR system, etc.

The foregoing is illustrative of exemplary embodiments and is not to be construed as limiting thereof. Although a few exemplary embodiments have been described, those skilled in the art will readily appreciate that many modifications are possible without materially departing from the present inventive concept.

What is claimed is:

1. An artificial neural network (ANN) system comprising:
a processor configured to perform node operations with respect to a plurality of nodes included in each layer of an ANN to obtain a plurality of result values of the node operations, and to perform a quantization operation on the obtained plurality of result values based on a k-th fixed-point format for a current quantization of the each layer to obtain a plurality of quantization values;
a virtual overflow detection circuit configured to generate virtual overflow information indicating a frequency distribution of valid bit numbers of the obtained plurality of quantization values, wherein a valid bit number indicates a non-zero most significant bit of an integer portion of a quantized value; and
a data format controller configured to determine a (k+1)-th fixed-point format for a next quantization of the each layer based on the generated virtual overflow information,
wherein the virtual overflow detection circuit is further configured to generate a plurality of count signals indicating frequency values of the valid bit numbers and to provide the generated plurality of count signals as the virtual overflow information.

2. The ANN system of claim 1, wherein the virtual overflow detection circuit is further configured to:
generate a plurality of thermometer codes corresponding to the obtained plurality of quantization values; and
generate the virtual overflow information based on the generated plurality of thermometer codes.

3. The ANN system of claim 1, wherein the data format controller is further configured to:
calculate an average and a variance of the valid bit numbers; and
determine a fractional length of the (k+1)-th fixed-point format based on the calculated average and the calculated variance.

4. The ANN system of claim 1, wherein the data format controller is further configured to determine whether the plurality of quantization values are in an overflow proximity state or in an underflow proximity state based on the generated virtual overflow information.

5. The ANN system of claim 4, wherein, based on the data format controller determining that the plurality of quantization values are in the overflow proximity state, the data format controller is further configured to decrease a fractional length of the (k+1)-th fixed-point format to be shorter than a fractional length of the k-th fixed-point format.

6. The ANN system of claim 4, wherein, based on the data format controller determining that the plurality of quantization values are in the underflow proximity state, the data format controller is further configured to increase a fractional length of the (k+1)-th fixed-point format to be longer than a fractional length of the k-th fixed-point format.

7. The ANN system of claim 4, wherein the data format controller is further configured to determine that the plurality of quantization values are in the overflow proximity state, based on a ratio of a frequency value of a maximum valid bit number of the valid bit numbers with respect to a sum of frequency values of the valid bit numbers being higher than an overflow threshold ratio.

8. The ANN system of claim 4, wherein the data format controller is further configured to determine that the plurality of quantization values are in the underflow proximity state, based on a ratio of a frequency value of a maximum valid bit number of the valid bit numbers with respect to a sum of frequency values of the valid bit numbers being lower than an underflow threshold ratio.

9. The ANN system of claim 1, wherein the virtual overflow detection circuit comprises:
a thermometer code generation circuit configured to sequentially receive the obtained plurality of quantization values and replace valid bits of each quantization value to sequentially generate a plurality of thermometer codes corresponding to the obtained plurality of quantization values.

10. The ANN system of claim 9, wherein the thermometer code generation circuit comprises:
a plurality of OR logic gates configured to perform an OR logic operation on every two adjacent bits of each quantization value to generate each thermometer code.

11. The ANN system of claim 9, wherein the virtual overflow generation circuit further comprises:
an accumulation circuit configured to accumulate the generated plurality of thermometer codes bit by bit to generate a plurality of accumulation values; and
a subtraction circuit configured to subtract two adjacent accumulation values of the generated plurality of accumulation values to generate the plurality of count signals and to provide the generated plurality of count signals as the virtual overflow information.

12. The ANN system of claim 9, wherein the virtual overflow generation circuit further comprises:
a count code generation circuit configured to sequentially receive the generated plurality of thermometer codes, to maintain a highest valid bit as 1 of valid bits, and to replace other valid bits from 1 to 0 with respect to each thermometer code to sequentially generate a plurality of count codes corresponding to the generated plurality of thermometer codes; and
an accumulation circuit configured to accumulate the generated plurality of count codes bit by bit to generate the plurality of count signals and to provide the generated plurality of count signals as the virtual overflow information.

13. The ANN system of claim 12, wherein the count code generation circuit comprises:
a plurality of XOR logic gates configured to perform an XOR logic operation on every two adjacent bits of each thermometer code to generate each count code corresponding to each thermometer code.

14. The ANN system of claim 1, wherein the virtual overflow detection circuit comprises:
a multiplexer configured to sequentially receive the obtained plurality of quantization values and to divide the received plurality of quantization values to positive quantization values and negative quantization values based on a sign bit included in each quantization value;
a first detection circuit configured to generate positive count signals indicating frequency values of the valid bit numbers of the positive quantization values; and
a second detection circuit configured to generate negative count signals indicating frequency values of the valid bit numbers of the negative quantization values.

15. The ANN system of claim 1, wherein:
the virtual overflow detection circuit is further configured to generate a plurality of virtual overflow information corresponding to a plurality of layers of the ANN, and the data format controller is further configured to determine the (k+1)-th fixed-point format with respect to each layer based on the generated plurality of virtual overflow information.

16. An artificial neural network (ANN) system, comprising:
a virtual overflow detection circuit configured to:
generate a plurality of thermometer codes corresponding to a plurality of quantization values, the plurality of quantization values being obtained by performing a quantization operation based on a fixed-point format,
generate virtual overflow information indicating a frequency distribution of valid bit numbers of the plurality of quantization values based on the generated plurality of thermometer codes, wherein a valid bit number indicates a non-zero most significant bit of an integer portion of a quantized value; and
a data format controller configured to update the fixed-point format based on the generated virtual overflow information,
wherein the virtual overflow detection circuit comprises a thermometer code generation circuit configured to generate the plurality of thermometer codes, an accumulation circuit configured to generate a plurality of accumulation values, and a subtraction circuit configured to provide a generated plurality of count signals as the virtual overflow information.

17. A method of controlling a fixed point format in an artificial neural network (ANN) system, the method comprising:
performing node operations with respect to a plurality of nodes included in each layer of an ANN to obtain a plurality of result values of the node operations;
performing a quantization operation on the obtained plurality of result values based on a k-th fixed-point format for a current quantization of the each layer to obtain a plurality of quantization values;
generating, by a virtual overflow detection circuit, virtual overflow information indicating a frequency distribution of valid bit numbers of the obtained plurality of quantization values, wherein a valid bit number indicates a non-zero most significant bit of an integer portion of a quantized value; and
determining a (k+1)-th fixed-point format for a next quantization of the each layer based on the generated virtual overflow information,
wherein the generating of the virtual overflow information comprises:
generating a plurality of thermometer codes corresponding to the obtained plurality of quantization values;
generating a plurality of count signals indicating frequency values of the valid bit numbers based on the generated plurality of thermometer codes; and
providing the generated plurality of count signals as the virtual overflow information.

18. The method of claim 17, wherein the determining the (k+1)-th fixed-point format for the next quantization comprises:
determining whether the obtained plurality of quantization values are in an overflow proximity state or in an underflow proximity state based on the generated virtual overflow information.

* * * * *